(12) United States Patent
Xu et al.

(10) Patent No.: US 8,538,961 B2
(45) Date of Patent: Sep. 17, 2013

(54) INFORMATION PROCESSING APPARATUS AND METHOD, AND PROGRAM

(75) Inventors: Chao Xu, Tokyo (JP); Tomohiko Gotoh, Kanagawa (JP); Tamaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1033 days.

(21) Appl. No.: 11/553,259

(22) Filed: Oct. 26, 2006

(65) Prior Publication Data

US 2007/0103565 A1 May 10, 2007

(30) Foreign Application Priority Data

Nov. 2, 2005 (JP) ................................ 2005-319724

(51) Int. Cl.
*G06F 17/30* (2006.01)

(52) U.S. Cl.
USPC .......................................... 707/736; 382/159

(58) Field of Classification Search
None
See application file for complete search history.

(56) References Cited

U.S. PATENT DOCUMENTS

| 6,721,759 B1 | 4/2004 | Rising, III |
| 6,950,554 B2 | 9/2005 | Shiratani |
| 7,421,455 B2 * | 9/2008 | Hua et al. .............................. 1/1 |
| 7,528,868 B2 * | 5/2009 | Perotti et al. ............... 348/231.3 |
| 2001/0022621 A1 * | 9/2001 | Squibbs ....................... 348/232 |
| 2002/0167683 A1 * | 11/2002 | Hanamoto et al. ........... 358/1.14 |
| 2003/0184653 A1 | 10/2003 | Ohkubo |
| 2004/0001631 A1 * | 1/2004 | Camara et al. ................ 382/224 |
| 2005/0102246 A1 | 5/2005 | Movellan et al. |
| 2006/0257048 A1 * | 11/2006 | Lin et al. ....................... 382/276 |

FOREIGN PATENT DOCUMENTS

| EP | 0 990 996 A2 | 4/2000 |
| EP | 1 139 239 A2 | 10/2001 |
| JP | 10-51721 | 2/1998 |
| JP | 10-254746 | 9/1998 |
| JP | 2001-51877 | 2/2001 |
| JP | 2001-54041 | 2/2001 |
| JP | 2001-228528 | 8/2001 |
| JP | 2002-32751 | 1/2002 |
| JP | 2003-298991 | 10/2003 |
| JP | 2004-213129 | 7/2004 |
| JP | 2005-44330 | 2/2005 |
| WO | WO 00/39712 A1 | 7/2000 |

OTHER PUBLICATIONS

Jelena Tešić, "Metadata Practices for Consumer Photos", IEEE Multimedia, IEEE Service Center, vol. 12, No. 3, XP-011137101, Jul. 2005, pp. 86-92.

* cited by examiner

*Primary Examiner* — Dinku Gebresenbet

(74) *Attorney, Agent, or Firm* — Oblon, Spivak, McClelland, Maier & Neustadt, L.L.P.

(57) ABSTRACT

An information processing apparatus includes an extraction unit operable to extract metadata used for recognizing an event associated with a captured image from at least one of the captured image and attribute information concerning the captured image, and a recognition unit operable to recognize, on the basis of the metadata extracted by the extraction unit, the event associated with the captured image from among a plurality of predetermined events.

14 Claims, 28 Drawing Sheets

FIG. 7

| TAG NAME (VARIABLE) | DEFINITION | EXAMPLE | TYPE | |
|---|---|---|---|---|
| DateTimeOriginal | Photographing Time and Date | 2004:09:08 15:00:40 | An 8-bit byte containing one 7-vit ASCII code | EXIF INFORMATION |
| Flash | Flash | Flash Not Allowed | A 16-bit (2-byte) unsigned integer | |
| ExposureTime | Exposure Time | 1/125 Seconds | Two LONGs | |
| FNumber | F-Number | F3.5 | Two LONGs | |
| nx | Normalized (0–1) Face Region start point x | 0.585106 | float | FACE INFORMATION |
| ny | Normalized (0–1) Face Region start point y | 0.560284 | float | |
| nwidth | Normalized (0–1) Face Region width | 0.070922 | float | |
| nheight | Normalized (0–1) Face Region height | 0.106383 | float | |
| pitch | Pitch of head | 0.000000 | float | |
| yaw | Yaw of head | 0.000000 | float | |
| TotalFace | Number of Faces Found in One Image | 5 | int | |
| L | Lightness | 56 | int (0, 100) | COLOR SPACE INFORMATION |
| a | Color Hue | −80 | int (−100, 100) | |
| b | Saturation | 97 | int (−100, 100) | |

FIG. 8

```
1:  <Photo>
2:    <guid>{624D4F19-1249-4d18-AAF8-15E1BFFF076F}</guid>
3:    <FilePath>C:\Documents and Settings\aaa\ Desktop \test\IMGP2198.JPG</FilePath>
4:    <PixelXDimension>2400</PixelXDimension>
5:    <PixelYDimension>1600</PixelYDimension>
6:    <Make>AAA</Make>
7:    <Model>BBB</Model>
8:    <EXIFversion>0221</EXIFversion>
9:    <DateTimeOriginal>2005:06:05 12:02:26</DateTimeOriginal>
10:   <DateTimeDigitized>2005:06:05 12:02:26</DateTimeDigitized>
11:   <SceneCaptureType>Portrait</SceneCaptureType>
12:   <Flash>reserved</Flash>
13:   <ExposureTime>1/8</ExposureTime>
14:   <FNumber>35/10</FNumber>
15:   <FocalLength>18/1</FocalLength>
16:   <FocalLengthIn35mmFilm>27</FocalLengthIn35mmFilm>
17:   <ExposureProgram>Portrait mode</ExposureProgram>
18:   <MeteringMode>Pattern</MeteringMode>
19:   <ExposureMode>Manual exposure</ExposureMode>
20:   <WhiteBalance>Auto white balance</WhiteBalance>
21:   <FaceNumber>2</FaceNumber>
22:   <FaceData>0.766962,0.477876,0.088496,0.058997,0.000000,-30.000000</FaceData>
23:   <FaceData>0.501475,0.433628,0.088496,0.058997,0.000000,-30.000000</FaceData>
24:   <ClassifiedEvent> Wedding </ClassifiedEvent>
25:   <UpdatedEvent>No Update</UpdatedEvent>
26: </Photo>
```

SUB EVENT CLUSTER B

NEST RELATION BETWEEN EVENT CLUSTER A AND SUB EVENT CLUSTER B

INFORMATION PROCESSING APPARATUS AND METHOD, AND PROGRAM

CROSS REFERENCES TO RELATED APPLICATIONS

The present invention contains subject matter related to Japanese Patent Application JP 2005-319724 filed in the Japanese Patent Office on Nov. 2, 2005, the entire contents of which are incorporated herein by reference.

BACKGROUND OF THE INVENTION

1. Field of the Invention

The present invention relates to information processing apparatuses and methods, and programs, and more particularly, to an information processing apparatus and method, and a program in which events associated with captured images can be recognized.

2. Description of the Related Art

Various techniques for classifying photographs taken by digital cameras into groups are known.

Japanese Unexamined Patent Application Publication No. 10-51721 discloses the following technique. IDs that cannot be changed are embedded into photographs, and by using those IDs, the images are classified into groups or searched for, or playback of the images is restricted. Another technique is disclosed in Japanese Unexamined Patent Application Publication No. 2002-32751 in which a predetermined area is separated from an image, and features are extracted from the separated area so that the category of the image is determined on the basis of the extracted features.

SUMMARY OF THE INVENTION

It is common practice to arrange photographs according to events, such as arranging photographs taken in a party or during a journey into one group. According to this arrangement, if a user wishes to see photographs taken in a party, he/she can see them only by specifying the photographs classified as the party.

To arrange photographs according to events, it is necessary for a user to create a folder for each event and allocate photographs into the corresponding folders, and this is a nuisance for users who are not familiar with such an operation. Accordingly, it is probably very convenient if a device can automatically recognize events associated with captured images from the images and then arranges the images according to events.

It is thus desirable to enable an information processing apparatus to recognize events associated with captured images from the images or attribute information concerning the images.

According to an embodiment of the present invention, there is provided an information processing apparatus including extraction means for extracting metadata used for recognizing an event associated with a captured image from at least one of the captured image and attribute information concerning the captured image, and recognition means for recognizing, on the basis of the metadata extracted by the extraction means, the event associated with the captured image from among a plurality of predetermined events.

The recognition means may manage information concerning the recognized event in association with the captured image.

The information processing apparatus may further include computation means for dividing a plurality of images into groups, and the recognition means may set an event for each group formed by the computation means.

The information processing apparatus may further include display control means for displaying typical images included in groups in which an identical event is set.

The display control means may display as a list images included in a group corresponding to a typical image selected from among the typical images.

The computation means may divide the plurality of images so that a node where a variation in time intervals between times represented by time information included in the attribute information concerning each image is greater than a threshold serves as a boundary between the groups.

The computation means may manage the plurality of images in the form of a binary tree structure, and may divide the plurality of images such that the computation means computes the ratio of a deviation of a time interval between child nodes linked to a target node which serves as a parent node of the child nodes to a standard deviation of time intervals of times represented by time information concerning images in the target node and compares the computed ratio with a threshold to determine whether images included in the child nodes are divided into different groups or are classified into an identical group.

According to another embodiment of the present invention, there is provided an information processing method or a program including the steps of extracting metadata used for recognizing an event associated with a captured image from at least one of the captured image and attribute information concerning the captured image, and recognizing, on the basis of the extracted metadata, the event associated with the captured image from among a plurality of predetermined events.

According to an embodiment of the present invention, events associated with captured images can be recognized.

BRIEF DESCRIPTION OF THE DRAWINGS

FIG. 7 illustrates an example of information extracted by a feature extracting unit;

FIG. 8 illustrates an example of metadata;

DESCRIPTION OF THE PREFERRED EMBODIMENTS

Figure 1:
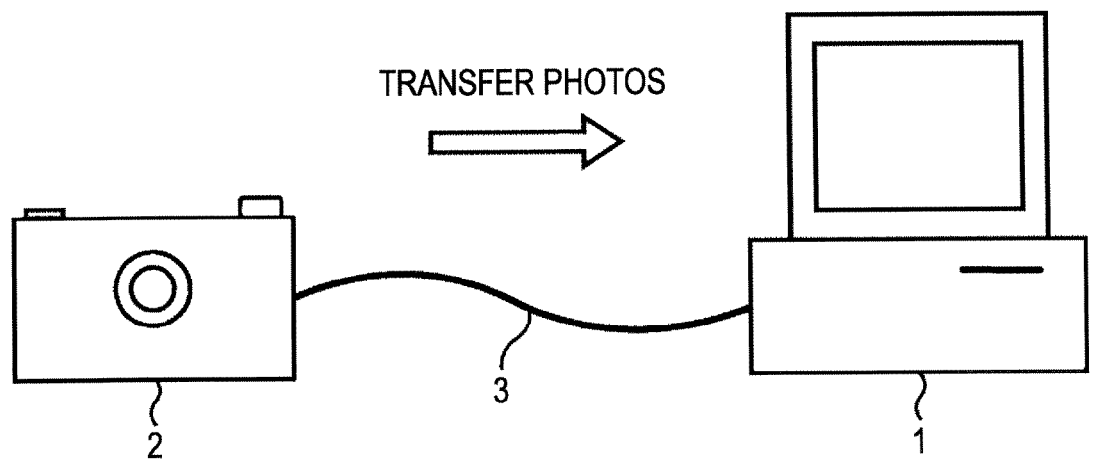
FIG. 1 illustrates the state in which a digital camera is connected to a personal computer configured in accordance with an embodiment of the present invention.

Before describing an embodiment of the present invention, the correspondence between the features of the claims and the embodiment disclosed in the specification or shown in the drawings is discussed below. This description is intended to assure that the embodiment supporting the claimed invention is described in the specification or shown in the drawings. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

The information processing apparatus (e.g., a personal computer 1 shown in FIG. 1) according to an embodiment of the present invention includes extraction means (e.g., a feature extracting unit 62 shown in FIG. 6) for extracting metadata used for recognizing an event (e.g., travel, flower-viewing, or party) associated with a captured image from at least one of the captured image and attribute information (e.g., EXIF information) concerning the captured image, and recognition means (e.g., an event recognizer 63 shown in FIG. 6) for recognizing, on the basis of the metadata extracted by the extraction means, the event associated with the captured image from among a plurality of predetermined events.

The information processing apparatus may include computation means (e.g., a computation unit 64 shown in FIG. 6) for dividing a plurality of images into groups.

The information processing apparatus may further include display control means (e.g., a user interface controller 65 shown in FIG. 6) for displaying typical images included in groups in which the same event is set.

Figure 36:
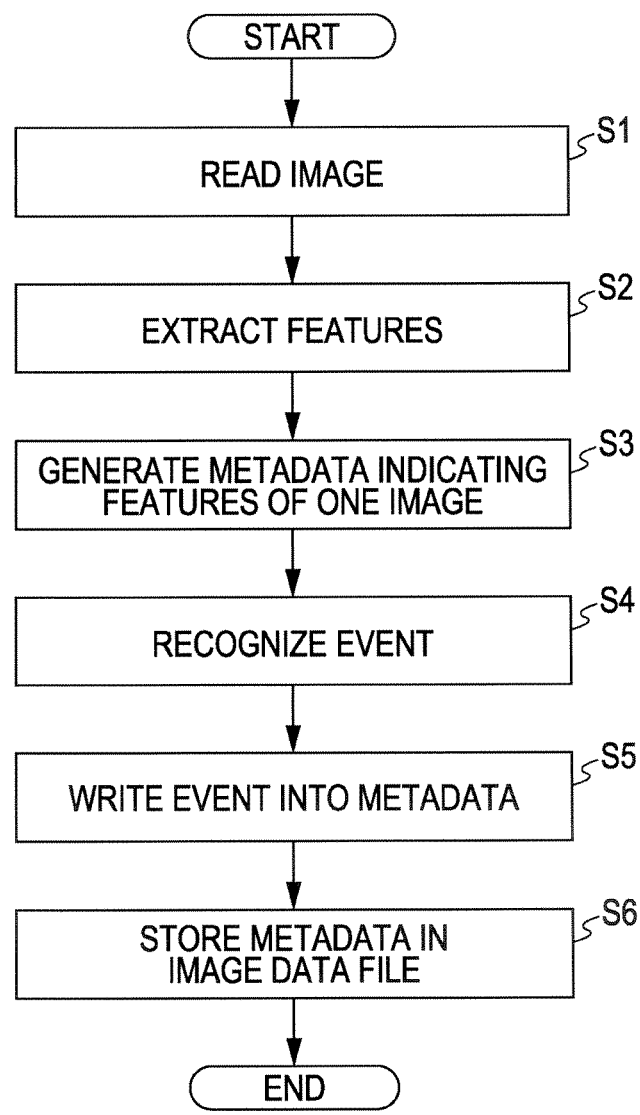
FIG. 36 is a flowchart illustrating an example of event recognition processing performed by a personal computer.

An information processing method or a program according to another embodiment of the present invention includes the steps of extracting metadata used for recognizing an event (e.g., travel, flower-viewing, or party) associated with a captured image from at least one of the captured image and attribute information (e.g., EXIF information) concerning the captured image (e.g., step S2 in FIG. 36) and recognizing, on the basis of the extracted metadata, the event associated with the captured image from among a plurality of predetermined events (e.g., step S4 in FIG. 36).

An embodiment of the present invention is described below with reference to the accompanying drawings.

FIG. 1 illustrates the state in which a digital camera 2 is connected to a personal computer 1 configured in accordance with an embodiment of the present invention.

In the example shown in FIG. 1, the personal computer 1 and the digital camera 2 are connected to each other with a cable 3 therebetween so that they can communicate with each other via the cable 3. A recording medium, such as a flash memory, is disposed within the digital camera 2, and photographs taken by a user are recorded on the recording medium.

When the user operates the personal computer 1 to read images recorded on the digital camera 2 and writes them into the personal computer 1 while the personal computer 1 is being connected to the digital camera 2, as shown in FIG. 1, an application program run on the personal computer 1 recognizes the event associated with each of the images. Information concerning the recognized events is managed in the personal computer 1 so that the information concerning each recognized event can be associated with the corresponding image.

For example, in the personal computer 1, eight events, such as "travel", "flower-viewing party", "firework", "driving/outing", "party", "wedding", "barbecue/camping", and "sport", are prepared beforehand as events that can be recognized, and information concerning one event selected from the eight events is associated with a target image.

In the personal computer 1, metadata is extracted from a target image or attribute information concerning the image, such as exchangeable image file format (EXIF) information, and the event of the target image is recognized by a support vector machine (SVM) on the basis of the extracted metadata. The metadata extracted from a certain image includes information concerning the number and the position of persons in the image, color space information, such as the lightness, color hue, and saturation, the photographing time and date and information indicating whether a flash has been used extracted from the EXIF information, etc. Based on such information, the event associated with the image is recognized. Details of the metadata are given below.

In this manner, an event associated with each image is automatically recognized by the personal computer 1 without the need for the user to select the event, and folders are generated according to events so that photographs taken in the same event can be arranged in the same folder. This enables the user to manage images according to events and also to specify an event to see the associated images.

If the user is seeing the photographs of a recent flower-viewing party, the personal computer 1 can automatically display the photographs of the flower-viewing party taken in the previous year, thereby making it possible to recall the user's memories.

In this manner, the personal computer 1 can execute various types of processing on the basis of the events managed in association with the images.

Figure 2:
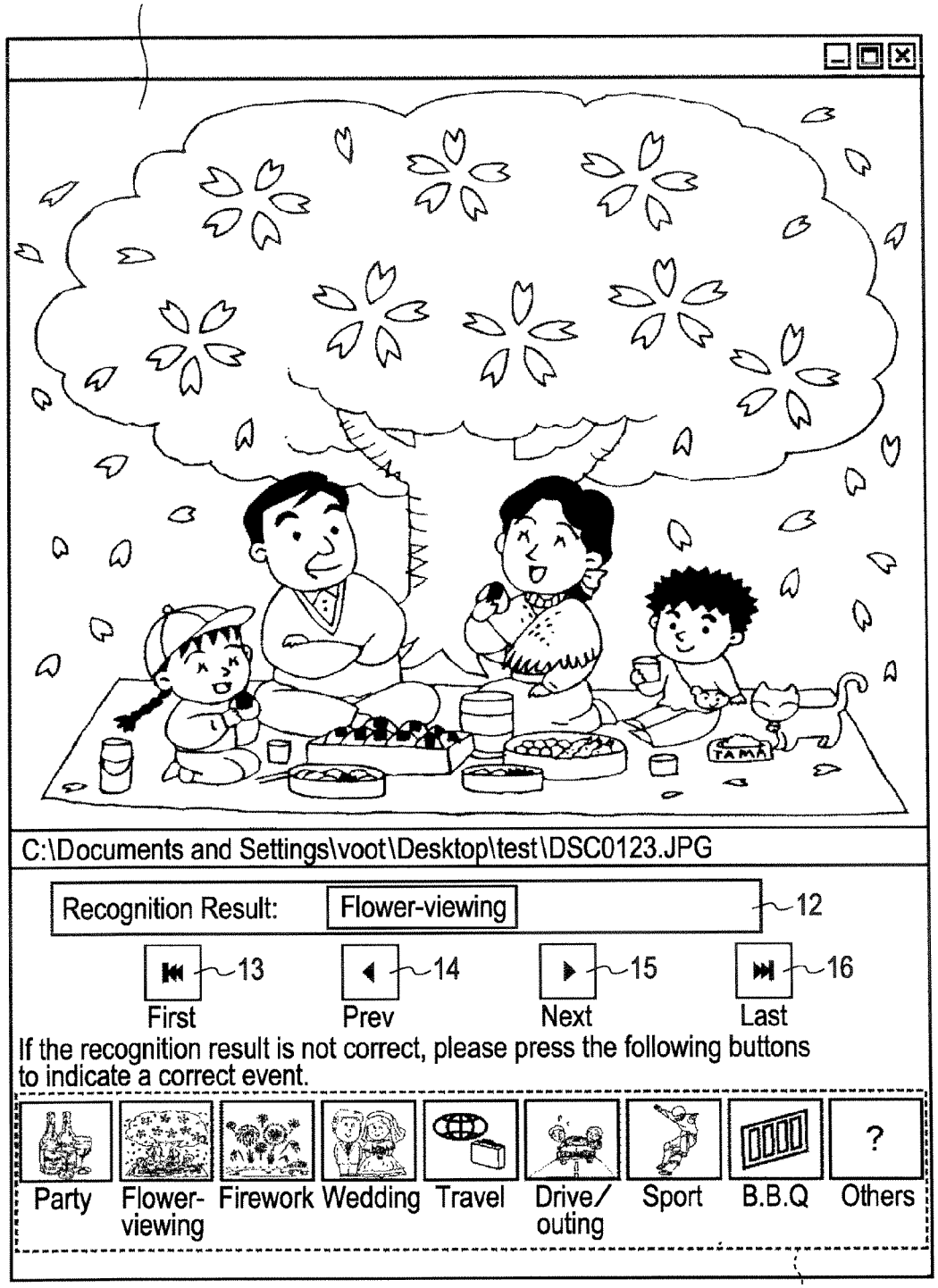
FIG. 2 illustrates an example of an image viewing screen.

FIG. 2 illustrates an example of an image viewing screen displayed on the personal computer 1.

In the example shown in FIG. 2, an image display area 11 is formed in the upper portion of the screen in which an image from which the corresponding event is recognized is displayed. In the image display area 11 shown in FIG. 2, the image including a tree and a family celebrating a flower-viewing party is displayed.

In the example shown in FIG. 2, information concerning a storage location (C:\Documents and Settings . . . ) of the image displayed in the image display area 11 is indicated below the image display area 11, and a recognition result display area 12 is displayed under the indication (C:\Documents and Settings . . . ). In the recognition result display area 12 shown in FIG. 2, "flower-viewing party" is indicated as a result of recognizing the event associated with the image displayed in the image display area 11.

In this manner, the user can check the event associated with the image displayed in the image display area 11 from the indication of the recognition result display area 12.

Under the recognition result display area 12, the following buttons are horizontally aligned: a button 13 for changing the image displayed in the image display area 11 to the top image among the images managed in the same folder; a button 14 for changing the image displayed in the image display area 11 to the previous image; a button 15 for changing the image displayed in the image display area 11 to the next image; and a button 16 for changing the image displayed in the image display area 11 to the last image among the images managed in the same folder. The user can switch the image displayed in the image display area 11, i.e., the image from which the event is to be recognized, by pressing those buttons 13 through 16.

A message "if the recognition result is not correct, please press the following buttons to indicate a correct event" is indicated under the buttons 13 through 16, and under the message, event buttons 17 associated with the above-described eight events and other events are indicated, and the user can press the event buttons 17 to display a correct event.

The user compares the image displayed in the image display area 11 with the recognition result indicated in the recognition result display area 12, and specifies a correct event by operating the event buttons 17 if he/she finds that the recognized event is not correct. This enables the personal computer 1 to associate the image displayed in the image display area 11 with the correct event.

When the user specifies a correct event, a file stored in the personal computer 1 and used for recognizing events is updated so that the event recognition precision can be improved. By referring to the above-described file, the personal computer 1 can check which events should be recognized for associated images according to the types of metadata extracted from the images.

Figure 3:
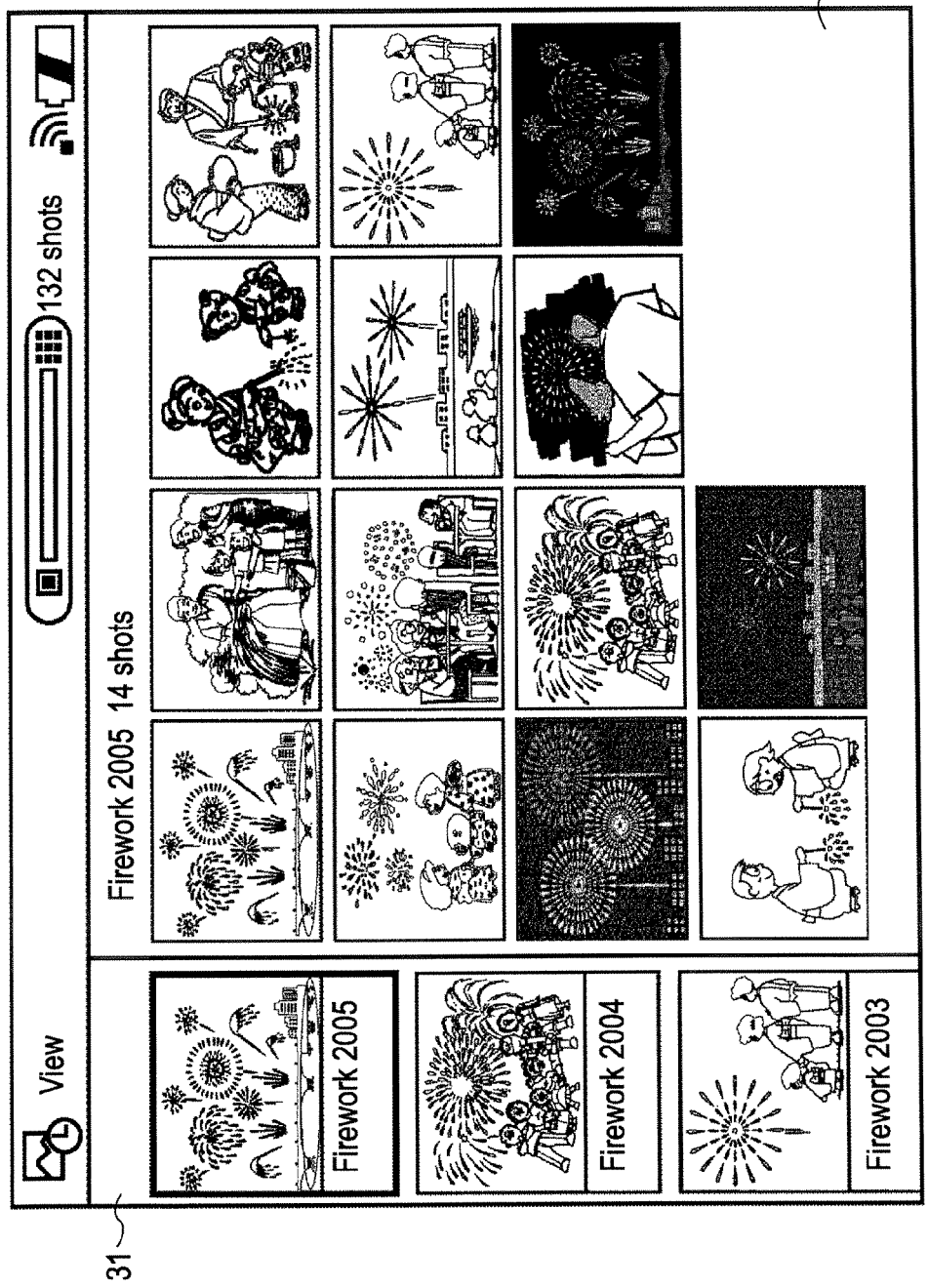
FIG. 3 illustrates another example of an image viewing screen.

FIG. 3 illustrates another example of the image viewing screen displayed on the personal computer 1.

In the personal computer 1, images read from the digital camera 2 are automatically classified into groups and are managed according to the groups, and the user can view or copy the images according to the groups.

As described below, images read from the digital camera 2 are classified into groups so that nodes where variations in photographing times of the images are greater than a threshold serve as boundaries between the groups. In one group, one event recognized on the basis of data extracted from the images contained in the group or attribute information concerning the images is set.

The viewing screen shown in FIG. 3 basically includes a typical image display area 31 formed at the left side of the screen and an image display area 32 formed at the right side of the screen.

In the typical image display area 31, a typical image of each of the groups in which the same event is set is displayed. In the example shown in FIG. 3, in the typical image display area 31, typical images of groups of the "firework" event, such as "firework 2005", "firework 2004", and "firework 2003", are vertically displayed.

If, for example, the user selects the images of the group "firework 2005", the group "firework 2004" and the group "firework 2003" in which the same event as that of the group "firework 2005", i.e., the "firework" event, is set are automatically selected among the groups managed by the personal computer 1, and the typical images of the selected groups are displayed so that the image viewing screen, such as that shown in FIG. 3, can be displayed.

Among the event names set in the corresponding groups, the "firework" is the name of the event set in the corresponding groups, and "2005", "2004, and "2003" are set based on information concerning the photographing time and date (day, month, and year) contained in the groups.

The user selects a predetermined group from the groups whose typical images are displayed so that a list of images of the selected group can be displayed.

In the example shown in FIG. 3, the group "firework 2005" is selected, and 14 images contained in the group "firework 2005" are displayed as a list (thumbnail) in the image display area 32. The images displayed in the image display area 32 shown in FIG. 3 are photographs taken in the event of "firework".

As discussed above, typical images of the groups in which the same event as that of the group selected by the user is set are automatically displayed so that an event-based clever search function can be implemented. Accordingly, the user can see photographs taken in the same situation in the past as that of the image selected by the user.

Figure 4:
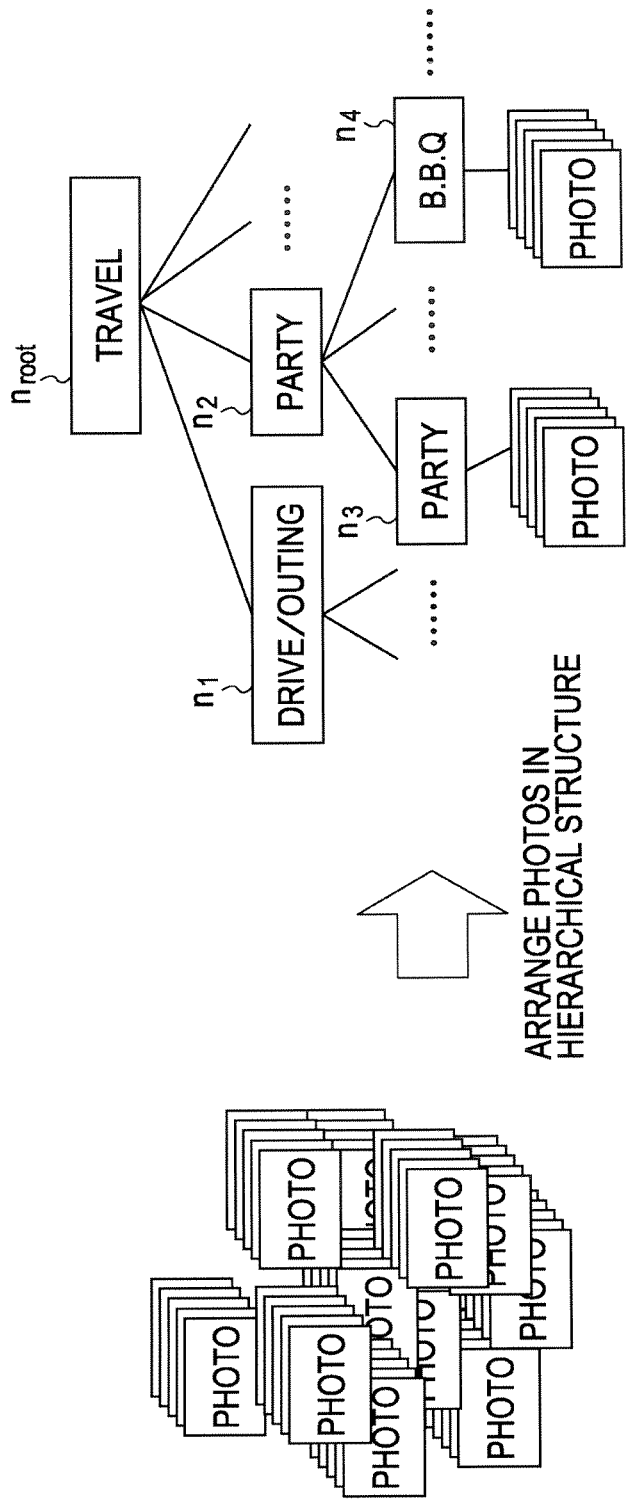
FIG. 4 illustrates the concept of management of images in a personal computer.

The groups in which events are set are managed in a hierarchical structure, as shown in FIG. 4, by the personal computer 1. In the hierarchical structure shown at the right side of FIG. 4, as pointed by the arrow, a root node $n_{root}$ in which the event "travel" is set is disposed at the top, and a node $n_1$ in which the event "drive/outing" is set and a node $n_2$ in which the event "party" is set are linked as child nodes to the root node $n_{root}$. A node $n_3$ in which the event "party" is set and a node $n_4$ in which the event "barbecue/camping (B.B.Q) is set are linked as child nodes to the node $n_2$. It should be noted that a plurality of images are contained in the node $n_3$ and the node $n_4$.

Images contained in each node (group) are linked directly to that node or indirectly to that node via another node, and the user can select a predetermined node to view or arrange images according to events with a preferable level of granularity.

The operations for managing images and displaying viewing screens performed by the personal computer 1 as described above are discussed below with reference to the flowcharts.

Figure 5:
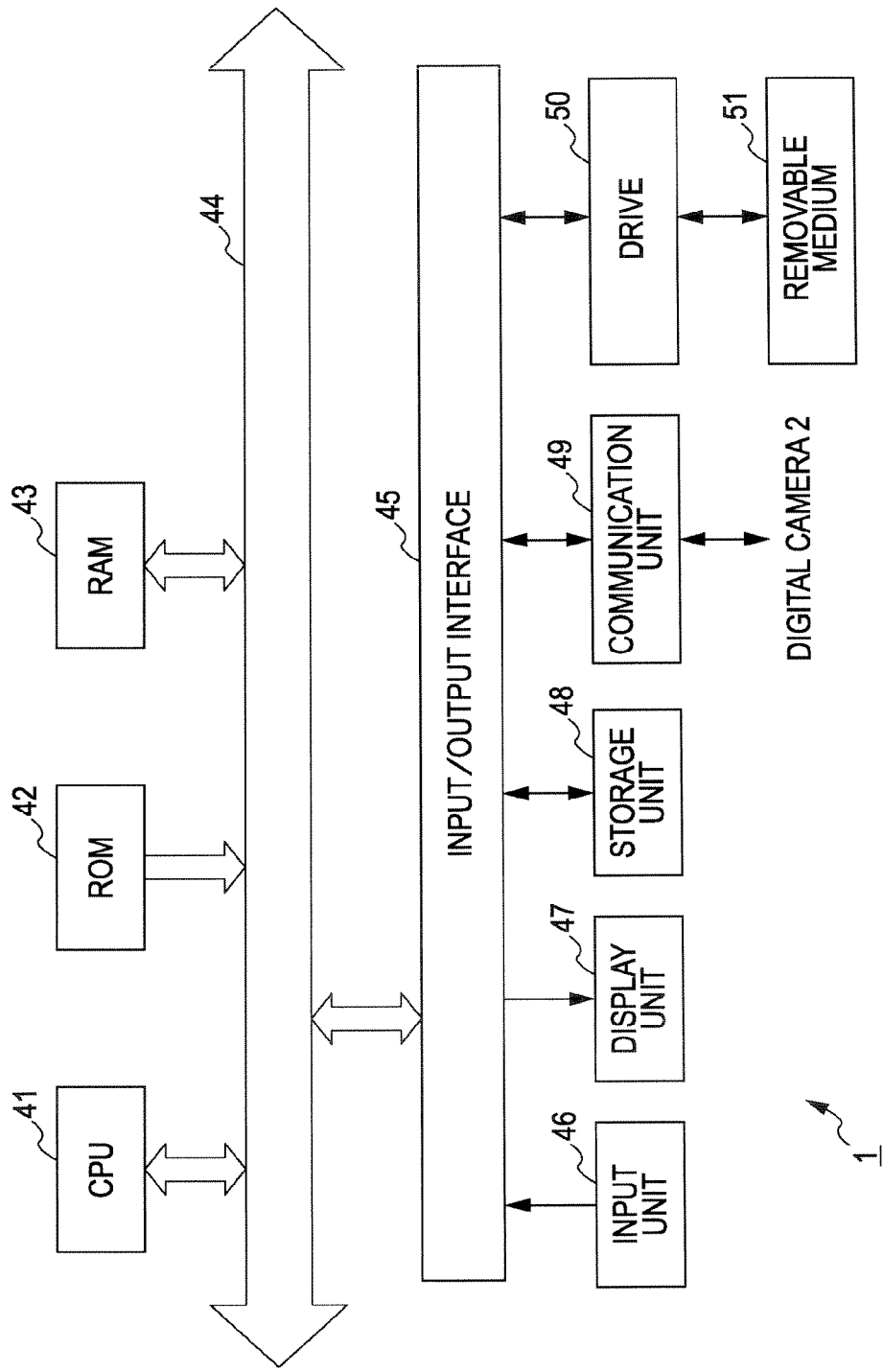
FIG. 5 is a block diagram illustrating an example of the configuration of a personal computer.

FIG. 5 is a block diagram illustrating the configuration of the personal computer 1 shown in FIG. 1.

A central processing unit (CPU) 41 executes various types of processing in accordance with programs recorded on a read only memory (ROM) 42 or a storage unit 48. In a random access memory (RAM) 43, programs and data executed by the CPU 41 are recorded. The CPU 41, the ROM 42, and the RAM 43 are connected to each other via a bus 44.

As the CPU 41, the cell described in "Cell Tanjo" (Newborn Cell) pages 89 to 117 on Feb. 28, 2005, Nikkei Electronics, Nikkei Business Publications. Inc. can be used.

An input/output interface 45 is connected to the CPU 41 via the bus 44. An input unit 46, such as a keyboard, a mouse, or a microphone, and an output unit 47, such as a display or a speaker, are connected to the input/output interface 45. The CPU 41 executes various types of processing in response to instructions input from the input unit 46. The CPU 41 outputs processing results to the output unit 47.

The storage unit 48 connected to the input/output interface 45 is, for example, a hard disk, and records various types of data, such as programs executed by the CPU 41 and images read from the digital camera 2. A communication unit 49 communicates with the digital camera 2 and outputs images or EXIF information read from the digital camera 2 to the CPU 41. The communication unit 49 also communicates with external devices via a network, such as the Internet or a local area network (LAN).

A drive 50 connected to the input/output interface 45 drives a removable medium 51, such as a magnetic disk, an optical disc, a magneto-optical (MO) disk, or a semiconductor memory, installed in the drive 50, and obtains programs or data recorded on the removable medium 51. The obtained programs or data are transferred to the storage unit 48 and are recorded thereon if necessary. The reading of images or EXIF information from the digital camera 2 may be performed via the removable medium 51.

Figure 6:
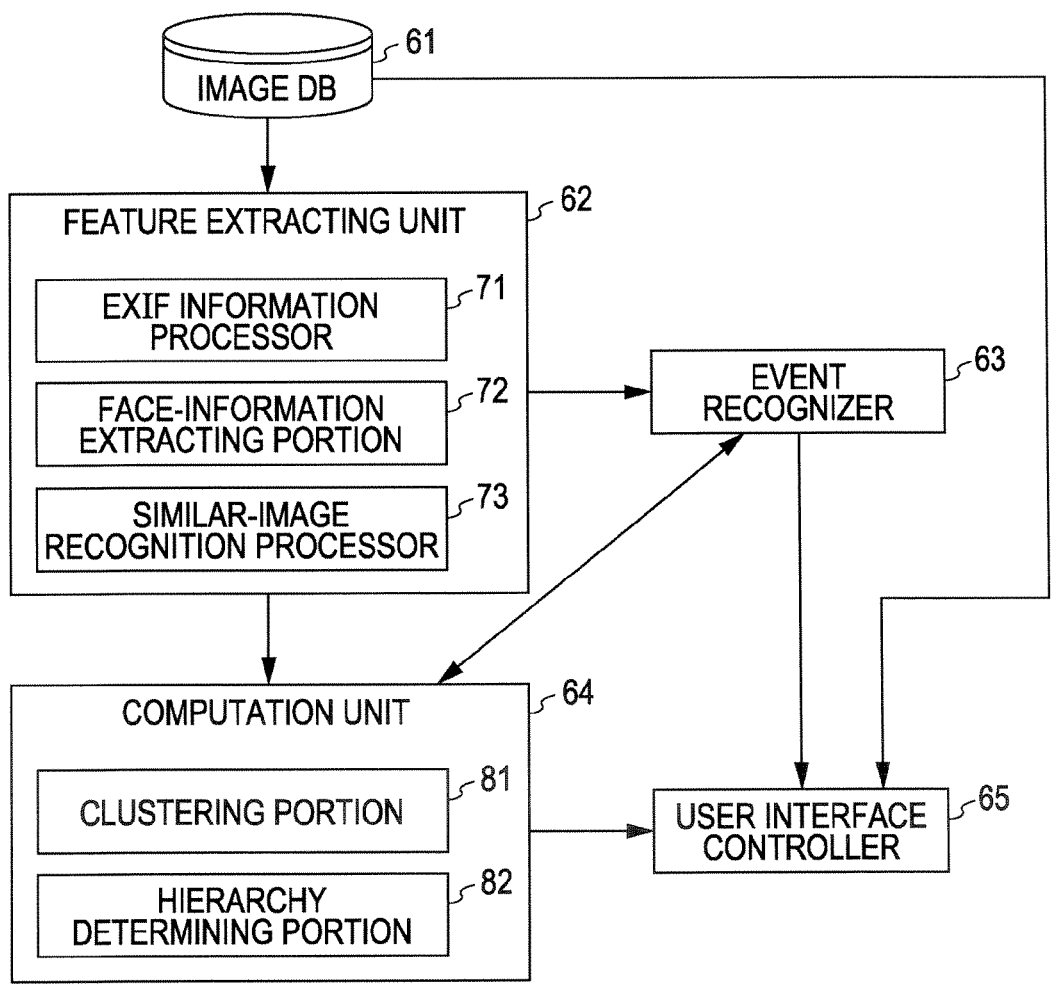
FIG. 6 is a block diagram illustrating the functional configuration of a personal computer.

FIG. 6 is a block diagram illustrating the functional configuration of the personal computer 1. At least some of the functions shown in FIG. 6 are implemented by executing predetermined programs by the CPU 41 shown in FIG. 5.

In the personal computer 1, an image database (DB) 61, a feature extracting unit 62, an event recognizer 63, a computation unit 64, and a user interface controller 65 are implemented. The feature extracting unit 62 includes an EXIF information processor 71, a face-information extracting portion 72, and a similar-image recognition processor 73. The computation unit 64 includes a clustering portion 81 and a hierarchy determining portion 82.

In the image DB 61, images read from the digital camera 2 or EXIF information (image information tags mainly for digital cameras, defined by JEITA in compliance with JEITA CP-3451-1 EXIF Ver.2.21 and JEITA CP-3461 DCF Ver.2.0), which is attribute information concerning each image, are recorded.

The feature extracting unit 62 reads, together with EXIF information, an image from which an event is to be recognized to extract metadata indicating the features of the image from the read data, and outputs the extracted metadata to the event recognizer 63.

More specifically, the EXIF information processor 71 of the feature extracting unit 62 extracts predetermined information, such as the photographing time and date, from the EXIF information read from the image DB 61. The EXIF information processor 71 also outputs the information concerning the photographing time and date contained in the EXIF information to the computation unit 64.

The face-information extracting portion 72 analyzes the image read from the image DB 61 to extract information concerning faces contained in the image. The technique for extracting face information is disclosed in, for example, Japanese Unexamined Patent Application Publication No. 2005-44330, and information concerning, for example, the number of faces contained in the image, is extracted by using this technique.

The similar-image recognition processor 73 analyzes the image read from the image DB 61 to extract information concerning, for example, the color space of the image. The technique for extracting the color space information is disclosed in, for example, International Publication No. 00/39712 pamphlet.

FIG. 7 illustrates an example of information extracted from the EXIF information processor 71, the face-information extracting portion 72, and the similar-image recognition processor 73 forming the feature extracting unit 62.

Information represented by the tag name "DateTimeOriginal" indicates the photographing time and date, and information represented by the tag name "Flash" indicates the condition of the flash. Information represented by the tag name "ExposureTime" indicates the exposure time when the image was captured, and information represented by the tag name "FNumber" indicates F-number (diaphragm) when the image was captured.

The four items, such as "DateTimeOriginal", "Flash", "ExposureTime", and "FNumber", are extracted from the EXIF information of the target image by the EXIF-information processor 71.

The value represented by "nx" indicates the position of a face contained in the image in the X-axis direction, and the value represented by "ny" indicates the position of a face contained in the image in the Y-axis direction. For example, the top left, the top right, the bottom left, and the bottom right of one image are indicated by (0, 0), (1, 0), (0, 1), and (1, 1), respectively, and the position of the frame indicating the range of the detected face in the X-axis direction and in the Y-axis direction is represented by "nx" and "ny".

The value represented by "nwidth" indicates the width of a face contained in the image, and the value represented by "nheight" indicates the height of a face contained in the image. The value represented by "pitch" indicates the vertical orientation of a face contained in the image, and the value represented by "yaw" indicates the horizontal orientation of a face contained in the image. The value represented by "TotalFace" indicates the number of faces contained in the image.

The seven items of information, such as "nx", "ny", "nwidth", "nheight", "pitch", "yaw", and "TotalFace", are extracted from the target image by the face-information extracting portion 72. For each item of information "nx", "ny", "nwidth", "nheight", "pitch", "yaw", "TotalFace", the same number of values as the number of faces contained in one image are extracted.

The value represented by "L" indicates the lightness. The value represented by "a" indicates the color hue of the image, and the value represented by "b" indicates the saturation of the image.

The three items of information, such as "L", "a", and "b", are extracted from the target image by the similar-image recognition processor 73.

The metadata including the above-described items of information is output from the feature extracting portion 62 to the event recognizer 63, and is used for recognizing the event associated with the image.

Referring back to the description with reference to FIG. 6, the event recognizer 63 selects an event from, for example, the above-described eight events, to recognize the event associated with the image, on the basis of the metadata supplied from the feature extracting unit 62, and writes the information concerning the recognized event into the metadata. The metadata containing the event information is output from the event recognizer 63 to the computation unit 64 or the user interface controller 65 if necessary.

FIG. 8 illustrates an example of metadata (containing event information) managed by the event recognizer 63. In FIG. 8, the numbers with the sign ":" (e.g., 1:) at the left side of the individual lines are attached for the convenience of explanation only, and do not form part of the metadata.

The metadata is managed, as shown in FIG. 8, as, for example, an eXtensible Markup Language (XML) document.

"Photo" in the first line indicates the start position of the metadata associated with a certain image.

The "guid" tag in the second line indicates Global Unique Identifier (GUID) associated with the metadata shown in FIG. 8. In the example shown in FIG. 8, the GUID of the image is "{624D4F19-1249-4d18-AAF8-15E1BFFF076F}". Based on this GUID, the image associated with the metadata can be identified.

The "FilePath" tag in the third line designates the storage location in the personal computer 1 of the image associated with the metadata shown in FIG. 8. In the example shown in FIG. 8, the storage location of the image is "C:\Documents and Settings\aaa\Desktop\test\IMGP2198.JPG".

The "PixelXDimension" tag in the fourth line and the "PixelYDimension" tag in the fifth line represent the number of pixels in the horizontal direction (X-axis direction) and the number of pixels in the vertical direction (Y-axis direction), respectively, of the image associated with the metadata shown in FIG. 8. In the example shown in FIG. 8, the numbers of pixels in the horizontal direction and in the vertical direction are 2400 and 1600, respectively.

The "Make" tag in the sixth line indicates the manufacturer of the digital camera 2 that captured the image associated with the metadata shown in FIG. 8. In the example shown in FIG. 8, the manufacturer of the digital camera 2 is "AAA".

The "Model" tag in the seventh line designates the model name of the digital camera 2 that captured the image associated with the metadata shown in FIG. 8. In the example shown in FIG. 8, the model name of the digital camera 2 is "BBB".

The "EXIFversion" tag in the eighth line represents the version of the EXIF information added to the image associated with the metadata shown in FIG. 8. In the example shown in FIG. 8, the version of the EXIF information is 0221 (version 2.21). In the ninth line through the 25th line, EXIF information extracted by the EXIF information processor 71 is described.

The "DateTimeOriginal" tag in the ninth line and the "DateTimeDigitized" tag in the tenth line indicate the photographing date and the photographing time of the image associated with the metadata shown in FIG. 8. In the example shown in FIG. 8, the photographing date is "2005:06:05" (Jun. 5, 2005), and the photographing time is "12:02:26".

The "SceneCaptureType" tag in the eleventh line indicates the mode in which the image associated with the metadata shown in FIG. 8 was captured. In the example shown in FIG. 8, the photographing mode is "Portrait".

The "Flash" tag in the twelfth line indicates the mode of the flash when the image associated with the metadata shown in FIG. 8 was captured. In the example shown in FIG. 8, the mode of the flash is "reserved".

The "ExposureTime" tag in the 13th line designates the exposure time when the image associated with the metadata shown in FIG. 8 was captured. In the example shown in FIG. 8, the exposure time is 1/8.

The "FNumber" tag in the 14th line represents the F-number when the image associated with the metadata shown in FIG. 8 was captured. In the example shown in FIG. 8, the F-number is 35/10.

The "FocalLength" in the 15th line indicates the focal length when the image associated with the metadata shown in FIG. 8 was captured. In the example shown in FIG. 8, the focal length is 18/1.

The "FlocalLengthIn35mmFilm" tag in the 16th line represents the focal length in terms of 35 mm when the image associated with the metadata shown in FIG. 8 was captured. In the example shown in FIG. 8, the focal length is 27 in terms of 35 mm.

The "ExposureProgram" tag in the 17th line indicates the exposure adjusting program when the image associated with the metadata shown in FIG. 8 was captured. In the example shown in FIG. 8, the exposure adjusting program is "Portrait model".

The "MeteringMode" tag in the 18th line indicates the metering mode when the image associated with the metadata shown in FIG. 8 was captured. In the example shown in FIG. 8, the metering mode is "Pattern".

The "ExposureMode" tag in the 19th line indicates the exposure mode when the image associated with the metadata shown in FIG. 8 was captured. In the example shown in FIG. 8, the exposure mode is "Manual exposure".

The "WhiteBalance" tag in the 20th line indicates the setting of the white balance when the image associated with the metadata shown in FIG. 8 was captured. In the example shown in FIG. 8, the setting of the white balance is "Auto white balance".

The "FaceNumber" tag in the 21st line indicates the number of faces contained in the image associated with the metadata shown in FIG. 8. In the example shown in FIG. 8, the number of faces is 2 (the faces of two persons in the image). In the 21st and 22nd lines, face information extracted by the face-information extracting portion 72 is indicated.

The "FaceData" tag in the 22nd line indicates information concerning one of the two faces in the image associated with the metadata shown in FIG. 8. In the example shown in FIG. 8, the face information is "0.766962,0. 477876,0. 088496,0. 058997,0.000000,−30.000000", in which the numbers represent, from the left to the right, the position of the face in the X-axis direction ("nx" in FIG. 7), the position of the face in the Y-axis direction ("ny" in FIG. 7), the width of the face ("nwidth" in FIG. 7), the height of the face ("nheight") in FIG. 7), the vertical orientation of the face ("Pitch" in FIG. 7), and the horizontal orientation of the face ("yaw" in FIG. 7), respectively.

The "FaceData" tag in the 23rd line indicates information concerning the other face of the two faces in the image associated with the metadata shown in FIG. 8. In the example shown in FIG. 8, the face information is "0.501475,0.433628, 0.088496,0.058997,0.000000,−30.000000". Face information is described for each face found in the image.

The "ClassifiedEvent" in the 24th line indicates the event when the image associated with the metadata shown in FIG. 8 was captured. When an event is recognized by the event recognizer 63, the recognized event is written into this tag portion. In the example shown in FIG. 8, the event recognition result is "wedding".

The "UpdateEvent" tag in the 25th line indicates the event when the image associated with the metadata shown in FIG. 8 was captured. When the user specifies a correct event by operating the event buttons 17 on the screen shown in FIG. 2, the specified event is written into this tag portion by the event recognizer 63. In the example shown in FIG. 8, the specified event is "No Update" (no event is specified).

The "/Photo" in the 26th line indicates the end position of the metadata. Then, the metadata, such as that shown in FIG. 8, is arranged for each image, and is managed by the event recognizer 63. Information extracted by the similar-image recognition processor 73 is also written into the metadata in a manner similar to that in which the information extracted by the EXIF information processor 71 and the face-information extracting portion 72 is written as described above.

The recognition of an event by the event recognizer 63 is discussed below.

The event recognizer 63 recognizes an event on the basis of, for example, SVM.

SVM is one type of learning machine that performs classification. The SVM constructs a separating hyperplane so that the margin, which is the distance between a recognition plane and training points located in the vicinity of class boundaries, which are referred to as "support vectors", can be maximized, and performs classification by using the constructed separating hyperplane. If linear classification is difficult to perform, an input space is mapped into a higher-order feature space by a technique known as the "kernel trick", and then, linear classification is performed on the higher-order feature space. Accordingly, the problems caused by nonlinear classification can be solved by the SVM technique. SVMs exhibit higher generalization performance than multi-layered perceptrons that conduct learning by the error back propagation, which is widely used in the known pattern recognition field, and can obtain optimal solutions as a result of learning since they are formulated to solve the quadric convex programming problem.

Figure 9:
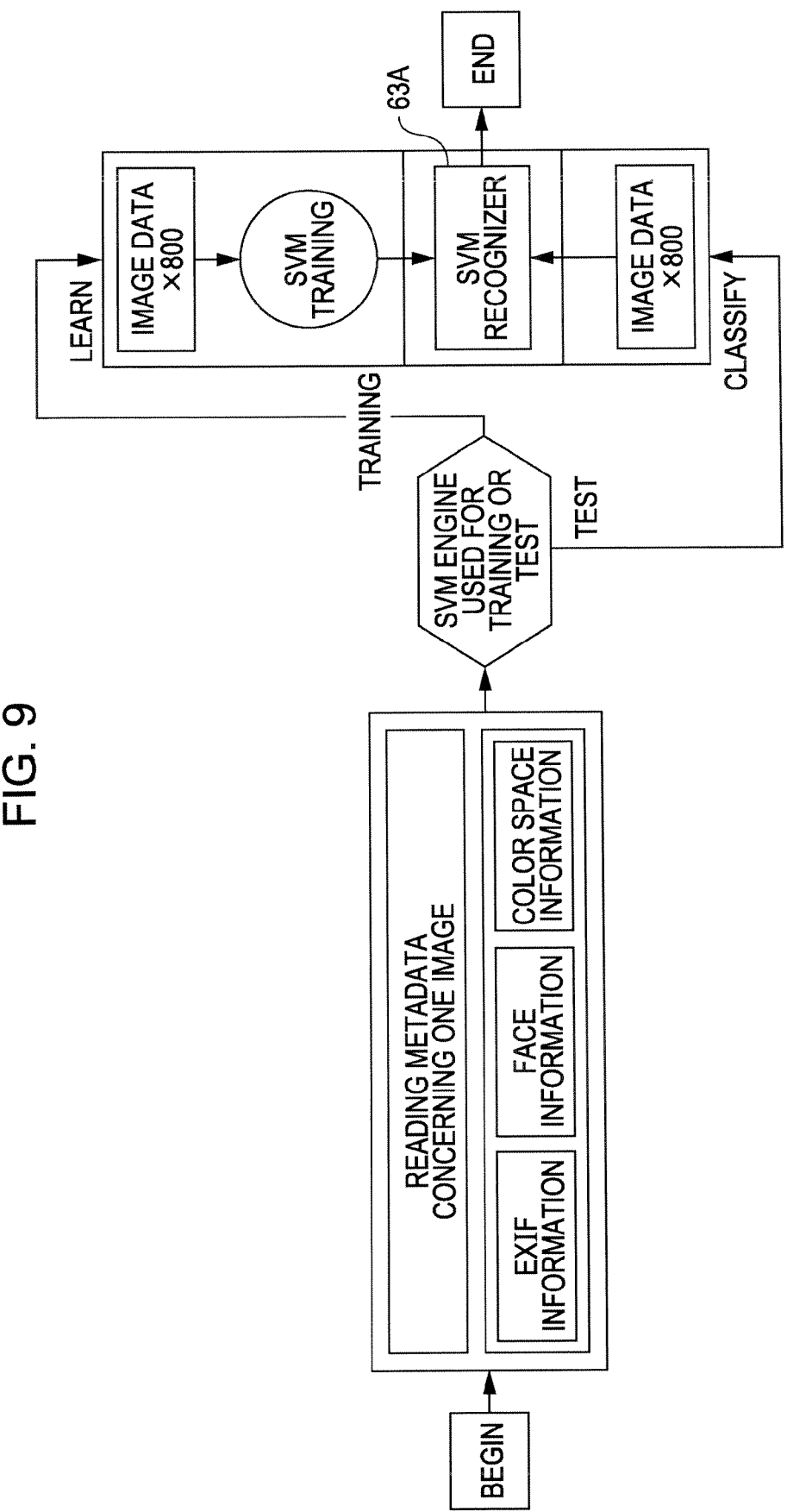
FIG. 9 illustrates the concept of a learning process and a testing process.

FIG. 9 illustrates the concept of a learning process and an event recognition test conducted by the event recognizer 63. The learning and testing, such as those shown in FIG. 9, are conducted when an application that implements, for example, functions, such as those shown in FIG. 6, is developed, and a recognition file, which is referred to when an event is recognized, is arranged in the event recognizer 63.

When metadata concerning a certain image is supplied to the personal computer 1, it is output to an SVM recognizer 63A as supervisor data via a discrimination unit when the SVM recognizer 63A is in the learning mode. The SVM recognizer 63A conducts SVM learning by using metadata concerning about 800 images and generates a recognition file used for recognizing events.

When the SVM recognizer 63A is in the testing mode, the metadata supplied to the personal computer 1 is output to the SVM recognizer 63A as learner data via the discrimination unit. The SVM recognizer 63A then refers to the recognition file obtained as a result of learning to recognize the event on the basis of the supplied metadata.

The recognition result obtained by the SVM recognizer 63A is output onto the screen in a form, such as that shown in FIG. 2, and the developer of the application sees the recognition result and determines whether the recognition result is correct to evaluate the test result. If the recognition result is not correct, the recognition file is updated, and the evaluation for that image is completed.

The evaluation described above is repeatedly performed on the metadata concerning 800 images, in which case, the metadata is the same data as that used for learning, and the resulting recognition file is arranged in the event recognizer 63. As the evaluation method, Holdout or K-fold cross-validation may be used.

Figure 10:
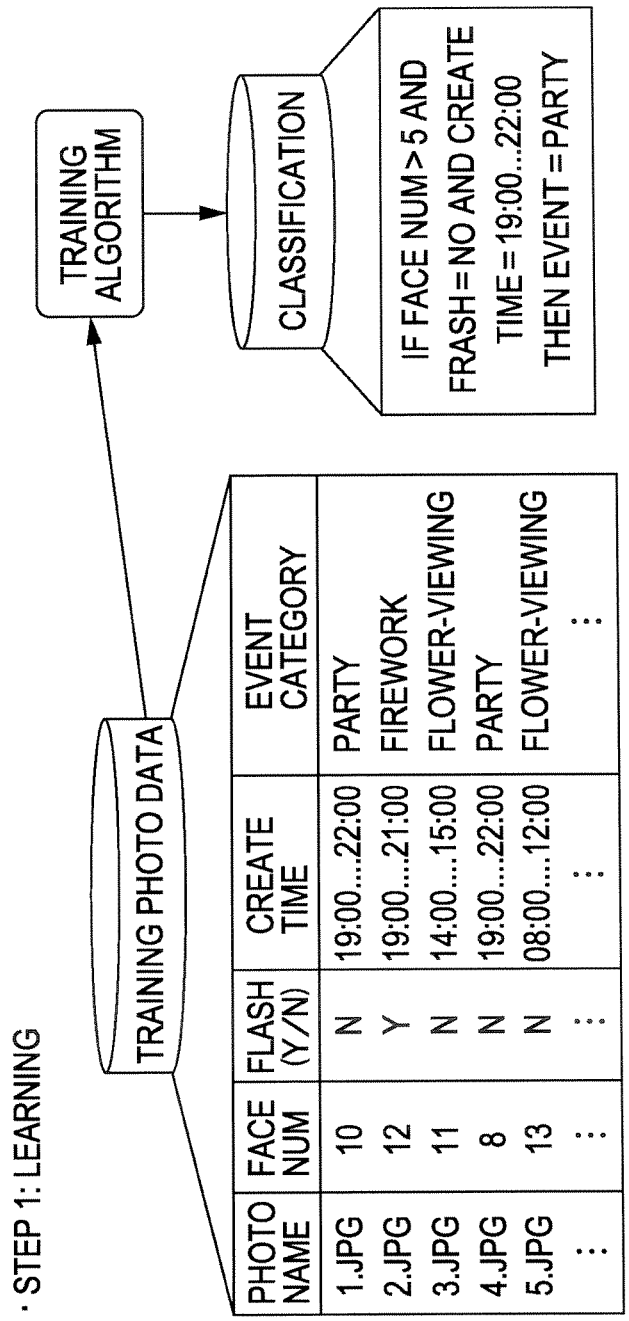
FIG. 10 illustrates a specific example of learning.

FIG. 10 illustrates a specific example of an event recognition learning process.

Learning is conducted, as shown in FIG. 10, by using learning images (training photo data) in accordance with a learning algorithm (training algorithm) so that a recognition file (classification) is generated. According to a recognition file in the example shown in FIG. 10, if the number of faces in the image is greater than "5", and if the condition of the flash is "No" (no flash), and if the photographing time is 19:00 to 22:00, the recognition result "party" can be obtained.

Figure 11:
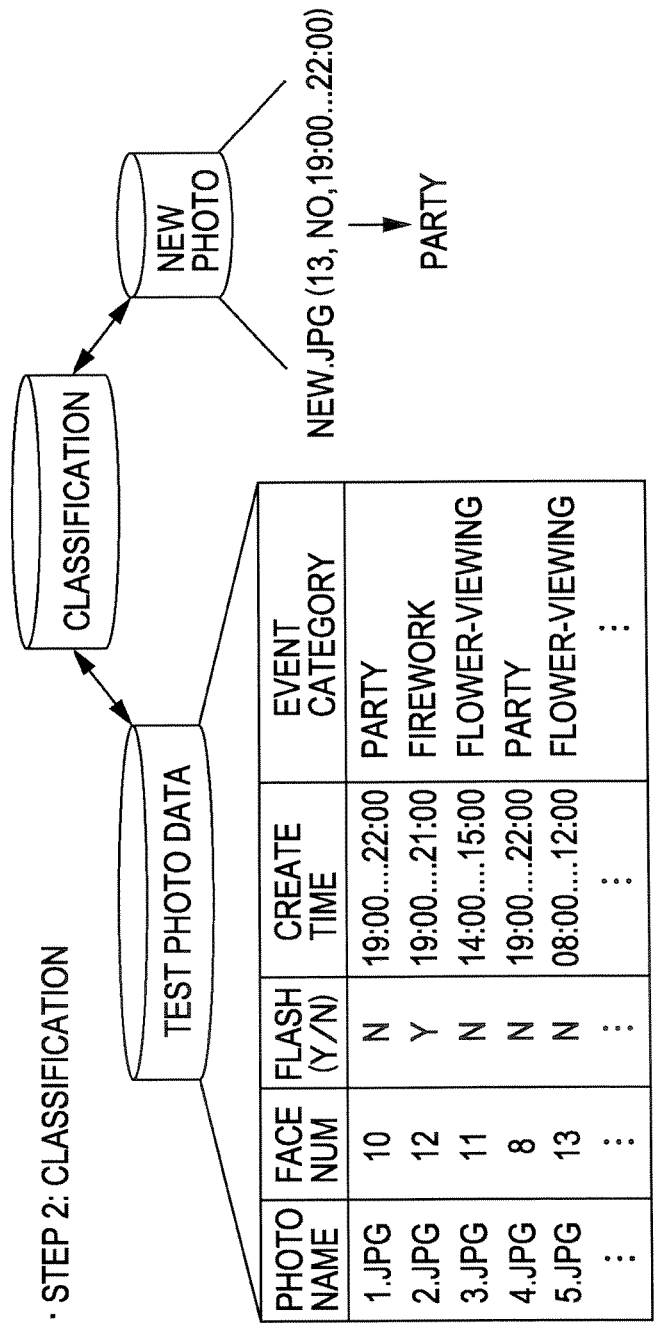
FIG. 11 illustrates a specific example of testing.

FIG. 11 illustrates a specific example of event recognition testing (classification).

Event recognition for testing images (test photo data), which are the same images as those used for learning shown in FIG. 10, is performed by referring to the recognition file generated as a result of learning. If metadata concerning a new image (new photo) different from the images used for learning or testing is supplied, the event when the new image was captured is recognized by referring to the same recognition file. In the example shown in FIG. 11, the event when the new image having a file name "New.jpg" was captured is recognized as "party".

Referring back to the description with reference to FIG. 6, the event recognizer 63 recognizes an event for a certain image, as described above, and also sets an event for a group of images classified by the computation unit 64.

For example, the event recognizer 63 reads grouping result information from the computation unit 64, and generates metadata for each group obtained by averaging the metadata of the images of the group supplied from the feature extracting unit 62. The event recognizer 63 then recognizes an event for the group on the basis of the generated metadata, and sets the event in the group as the recognition result.

The event set for each group is used for displaying a screen, such as that shown in FIG. 3, presenting images captured in the same event as the event associated with the image selected by the user.

The clustering portion 81 of the computation unit 64 performs clustering (grouping) on images on the basis of cluster data stored in the clustering portion 81 and the photographing times supplied from the EXIF information processor 71. As a result of clustering performed by the clustering portion 81, for example, the following clustering result can be obtained: the overall target images including the images subjected to clustering in the past present a binary tree structure.

The cluster data stored in the clustering portion 81 includes information indicating to which cluster (group) each of the images obtained in the past belongs or information concerning the binary tree structure of the overall images.

The hierarchy determining portion 82 determines a cluster that satisfies a predetermined condition on the basis of the information concerning the binary tree structure, which is the clustering result obtained from the clustering portion 81. The hierarchy determining portion 82 obtains, for example, information indicating which images are included in each cluster and information indicating to which cluster each image belongs, and generates cluster data indicating the binary tree structure of the overall images and the final clustering result.

Details of the processing executed by the computation unit 64 are discussed below.

A description is now given of the processing for dividing 100 images p1 through p100 into an event cluster A (including images that satisfy grouping condition A) and a sub event cluster B (including images that satisfy a grouping condition B).

The formation of a binary tree structure performed by the clustering portion 81 is first discussed with reference to FIGS. 12 through 20.

In FIGS. 12 through 20, each circle containing letter "p" followed by a number represents one image, and each circle containing letter "n" followed by a number represents one node. In FIGS. 12 through 20, the time passes in chronological order from the left to the right. It is now assumed that clustering is performed on the images p1 through p100 in the photographing time order (in chronological order from images p1 to p100, i.e., image p1 is the oldest and image p100 is the latest). A description is given later of clustering performed on individual images regardless of the photographing time order rather than a group of images arranged in the photographing time order, for example, a case where after images p1 and p2 are set to target images subjected to clustering (inserting images p1 and p2 into a binary tree structure), image p3, which is newer than image p1 and older than image p2, is set to be a target image.

Figure 12:
FIGS. 12 through 20 illustrate an example of the creation of a binary tree structure.

In the state in which clustering has not been performed, image p1 that was first captured and read from the digital camera 2 is inserted into the tree. In this initial state, there is no node, which serves as the root node, in the tree. Accordingly, image p1 itself becomes the root node, as shown in FIG. 12.

Figure 13:
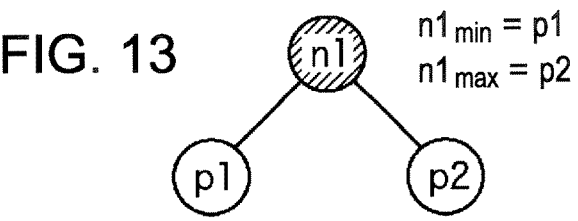

If image p2 is inserted after image p1, a new node, i.e., node n1, is formed, as shown in FIG. 13. Since the photographing time of image p2 is later than the photographing time of image p1, image p1 is linked to node n1 as the left child node, while image p2 is linked to node n1 as the right child node. Node n1 becomes the root node instead of image p1.

The photographing time of image p1 is recorded as the minimum time of node n1, while the photographing time of the image p2 is recorded as the maximum time of node n1. Alternatively, as the time of a parent node, the average (intermediate time) of the photographing times of two child nodes of the parent node may be recorded.

Figure 14:
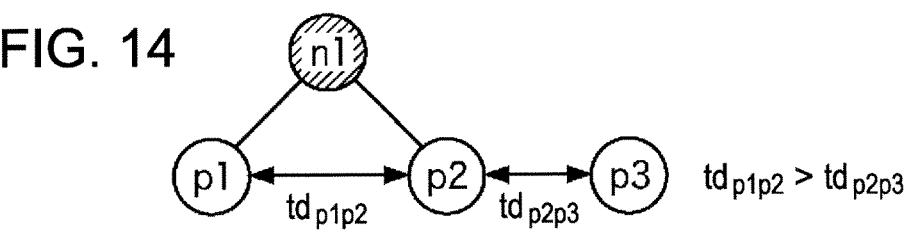
Figure 15:
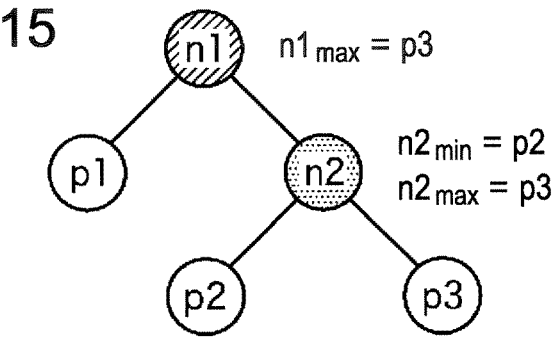

If image p3 is inserted into the tree after image p2, and if the time interval $td_{p2p3}$ between the photographing time of image p3 and the photographing time of image p2 is shorter than the time interval $td_{p1p2}$ between the photographing time of image p2 and the photographing time of image p1, as shown in FIG. 14, a new node, i.e., node n2, is formed, as shown in FIG. 15. Then, image p2 is linked to node n2 as the left child node, while image p3 is linked to node n2 as the right child node. Node n2 is linked to node n1 as the right child node instead of image p2.

The photographing time of image p2 is recorded as the minimum time of node n2, while the photographing time of image p3 is recorded as the maximum time of node n2. In this case, the maximum time of node n1, which is the parent node of node n2, is updated by the photographing time of image p3.

Figure 16:
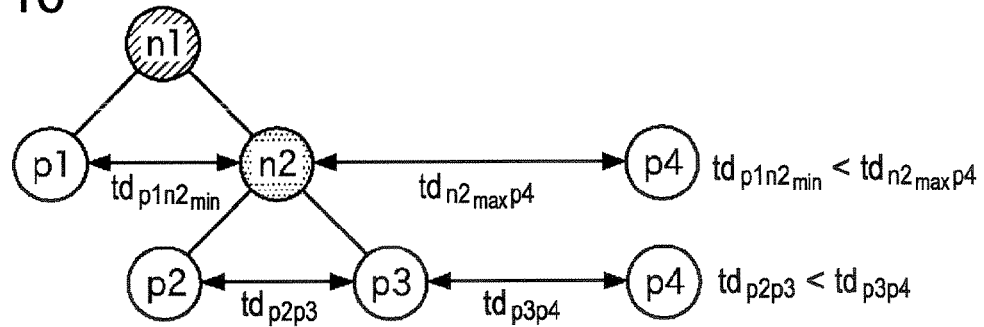
Figure 17:
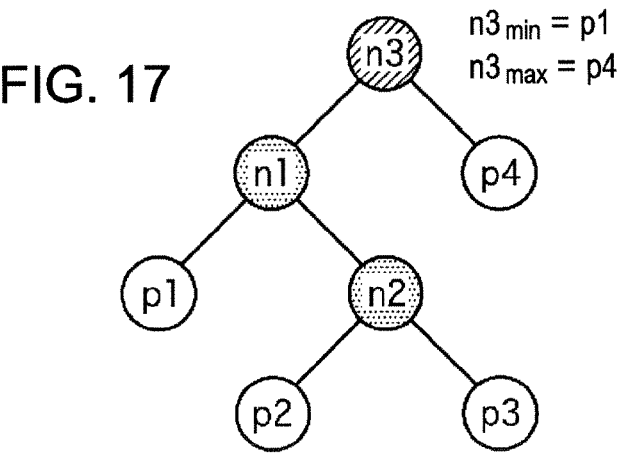

If image p4 is inserted into the tree after image p3, and if the time interval $td_{p3p4}$ between the photographing time of image p4 and the photographing time of image p3 is longer than the time interval $td_{p2p3}$ between the photographing time of image p3 and the photographing time of image p2 and if the time interval $td_{p2maxp4}$ between the photographing time of image p4 and the maximum time of node n2 is longer than the time interval $td_{p1n2min}$ between the minimum time of node n2 and the photographing time of image p1, as shown in FIG. 16, a new node, i.e., node n3, is formed, as shown in FIG. 17. Then, node n1 is linked to node n3 as the left child node, while image p4 is linked to node n3 as the right child node.

The minimum time of node n1 is recorded as the minimum time of node n3, while the photographing time of image p4 is recorded as the maximum time node n3.

Figure 18:
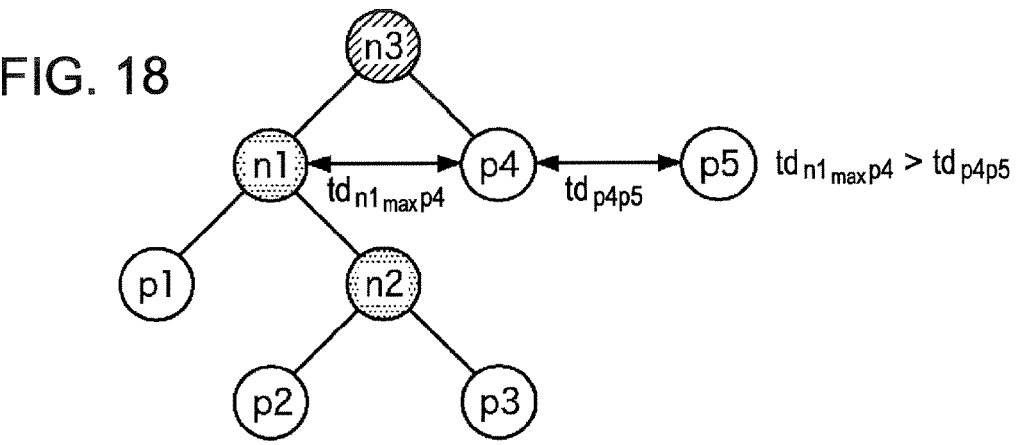
Figure 19:
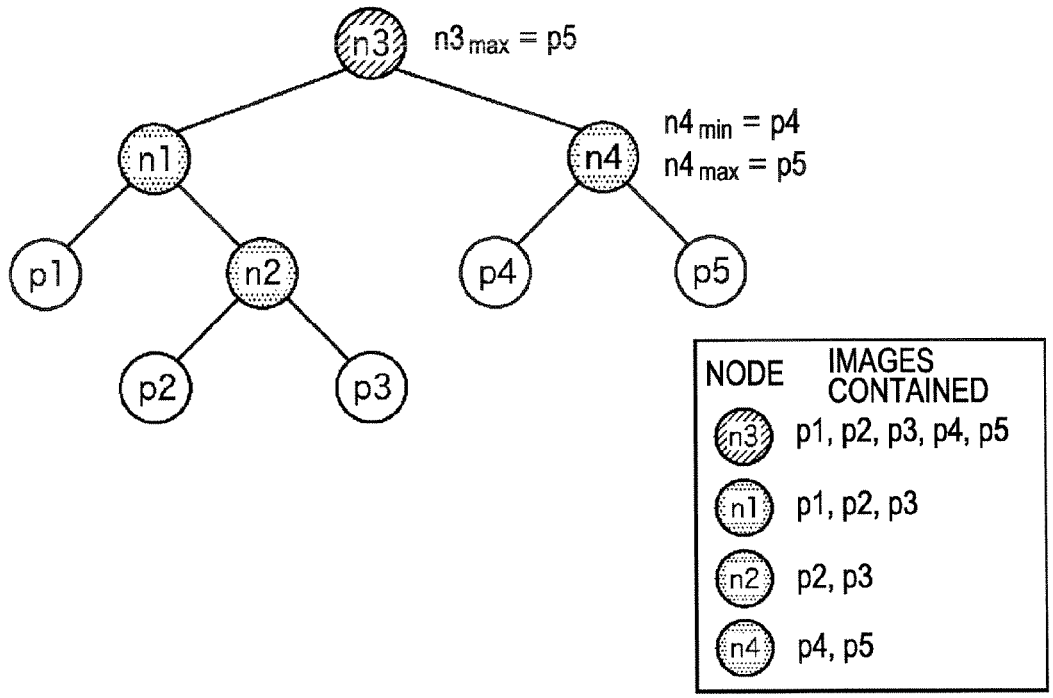
Figure 20:
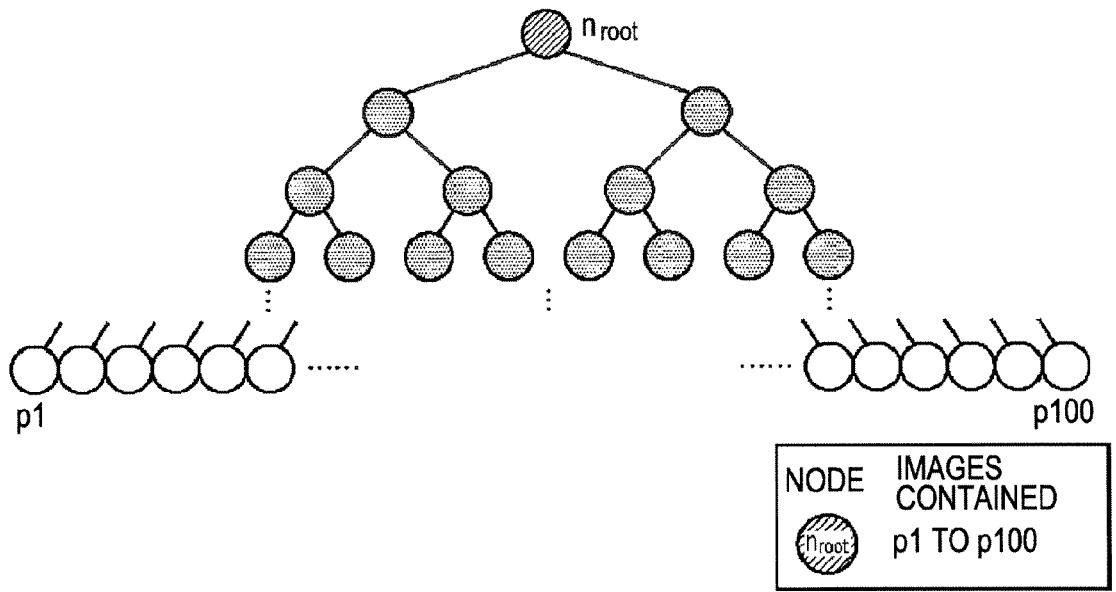

If image p5 is inserted into the tree after image p4, and if the time interval $td_{n1maxp4}$ between the photographing time of image p4 and the maximum time of node n1 is longer than the time interval $td_{p4p5}$ between the photographing time of image p5 and the photographing time of image p4, as shown in FIG. 18, a new node, i.e., node n4, is formed, as shown in FIG. 19. Then, image p4 is linked to node n4 as the left child node, while image p5 is linked to node n4 as the right child node. Node n4 is linked to node n3 as the right child node instead of image p4.

The photographing time of image p4 is recorded as the minimum time of node n4, while the photographing time p5 is recorded as the maximum time as node n4. In this case, the maximum time of node n3, which is the parent node of node n4, is updated by the photographing time of image p5.

At this point, a binary tree structure is constructed from node n1 to node n4 including five images p1 through p5.

Images contained in each node are images directly linked to that node or indirectly linked to that node via another node. Accordingly, if the tree shown in FIG. 19 is formed, images contained in node n3 are five images p1 through p5, and images contained in node n1 are three images p1 through p3. Images contained in node n2 are two images p2 and p3, and images contained in node n4 are two images p4 and p5.

In this manner, every time a new image is inserted, images having a shorter photographing time interval or an image and a node having a shorter time interval between the photographing time of the image and the set time of the node are linked to the same node.

When images p6 through p100 are inserted, the formation of nodes and the linkage of images or an image and a node are implemented in a manner similar to those for images p1 through p5. Finally, a binary tree structure, such as that shown in FIG. 20, in which the images p1 through p100 are contained in the root node $n_{root}$, is constructed.

A description is now given, with reference to FIGS. 21 through 27, of clustering performed by the hierarchy determining portion 82 on the basis of grouping conditions.

In the hierarchy determining portion 82, each node in a binary tree structure is specified as a target node, and the standard deviation sd of the time intervals between the photographing times of two images calculated for all images in the target node is calculated according to equation (1):

$$sd = \sqrt{\frac{\sum_{n=1}^{N}(td_n - \overline{td})^2}{N}} \quad (1)$$

where N represents the number of time intervals between the photographing times of the images and is equal to the number obtained by subtracting one from the number of images contained in the target node, $td_n$ designates the n-th temporally oldest time interval among the N time intervals, and $\overline{td}$ indicates the average of the time intervals td in the target node.

The deviation dev of the time interval between child nodes linked to the target node serving as the child's parent node (deviation dev is the absolute value of the difference between the time interval between the child nodes and the average of the time intervals of the photographing times) is calculated according to equation (2):

$$dev = |td_c - \overline{td}| \quad (2)$$

where N represents the number of time intervals between the photographing times of the images and is equal to the number obtained by subtracting one from the number of images contained in the target node, $td_c$ designates the time interval between child nodes, and $\overline{td}$ indicates the average of the time intervals td in the target node. The time interval $td_c$ between child nodes (two child nodes linked to the target node serving as the child's parent node) is the time interval between the photographing time of the temporally later image contained in the temporally earlier child node and the photographing time of the temporally earlier image contained in the temporally later child node. A specific example of the time interval $td_c$ is described below.

The ratio of the deviation dev calculated by equation (2) to the standard deviation sd calculated by equation (1) is set in the target node as split parameter th. The split parameter th is expressed by equation (3) and is a parameter, which serves as a basis for determining whether child nodes linked to the target node serving as the parent node are split into different clusters.

$$th = \frac{dev}{sd} \quad (3)$$

The values determined from the above-described equations (1) through (3) are specifically described below with reference to FIG. 21.

Figure 21:
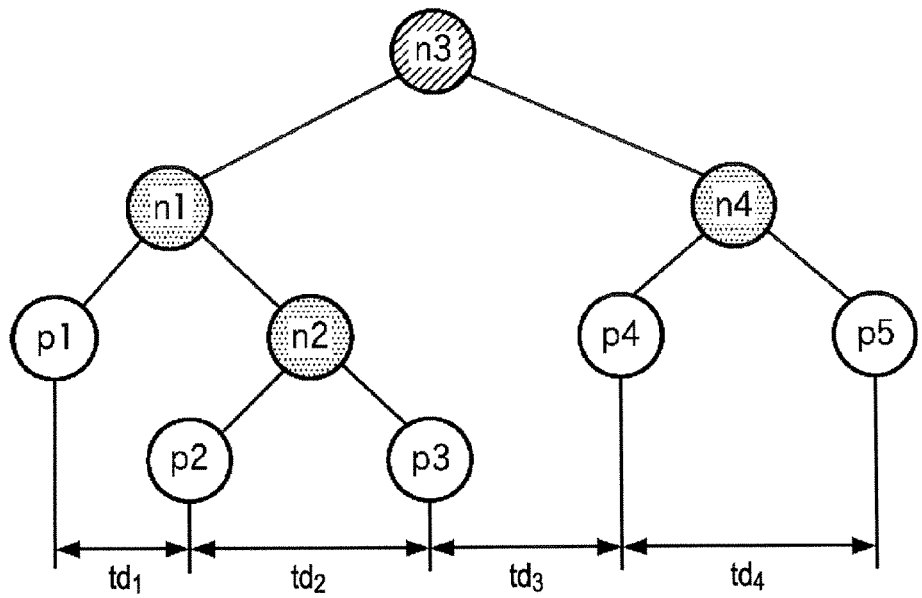
FIG. 21 illustrates clustering based on a grouping condition.

FIG. 21 illustrates the same tree as that shown in FIG. 19, which forms part of the overall binary tree structure constructed by the clustering portion 81.

In FIG. 21, $td_1$ represents the time interval between the photographing time of image p1 and that of image p2; $td_2$ indicates the time interval between the photographing time of image p2 and that of image p3; and $td_3$ represents the time interval between the photographing time of image p3 and that of image p4; and $td_4$ represents the time interval between the photographing time of image p4 and that of image p5.

If, for example, node n3 closest to the root node in FIG. 21, is set to be the target node, the corresponding values are substituted into equation (1) so that the standard deviation sd can be expressed by equation (4).

$$sd = \sqrt{\frac{(td_1 - \overline{td})^2 + (td_2 - \overline{td})^2 + (td_3 - \overline{td})^2 + (td_4 - \overline{td})^2}{4}} \quad (4)$$

The average of the time intervals of the photographing times is expressed by equation (5).

$$\overline{td} = \frac{td_1 + td_2 + td_3 + td_4}{4} \quad (5)$$

The deviation dev is expressed by equation (6).

$$dev = |td_3 - \overline{td}| \quad (6)$$

More specifically, two child nodes linked to the target node n3 serving as the child's parent node are node n1 and node n4. The time interval $td_3$ between the photographing time of the temporally later image p3 contained in the temporally earlier node n1 and the photographing time of the temporally earlier image p4 contained in the temporally later node n4 is the time interval between node n1 and node n4, and is used for calculating the deviation dev when node n3 is the target node.

The split parameter th when node n3 is the target node is calculated from the standard deviation sd calculated by equation (4) and the deviation dev calculated by equation (6), and is set in node n3.

After setting split parameters th for all the nodes, the hierarchy determining portion 82 sets thresholds for grouping conditions.

For example, threshold a is set as grouping condition A, and threshold b is set as grouping condition B. In this case, when a condition a>b is satisfied, such as a case where a=3.0 and b=2.6, clusters defined by grouping condition A are greater than clusters defined by grouping condition B, as shown in FIG. 22, in other words, several clusters defined by grouping condition B are formed in a cluster defined by grouping condition A.

Figure 22:
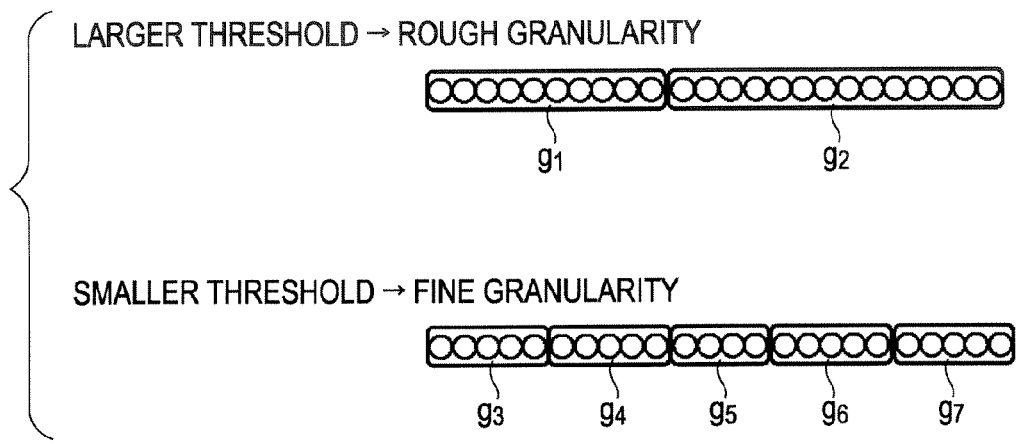
FIG. 22 illustrates the levels of granularity of clusters.

In the example shown in FIG. 22, the target images are divided into two clusters, i.e., group $g_1$ and $g_2$, by grouping condition A, while the target images are divided into five clusters, i.e., group $g_3$ through group $g_7$, by grouping condition B.

As described below, if a split parameter is greater than the threshold, a node in which the split parameter is set becomes a boundary between clusters. Accordingly, as the threshold is larger, it is less likely that the node becomes a boundary between clusters. Thus, the granularity of the clusters divided from the overall images becomes rough. Conversely, as the threshold is smaller, it is more likely that the node becomes a boundary between clusters, and thus, the granularity of the clusters divided from the overall images becomes fine.

If the time interval between the photographing time of one image and the photographing time of the next image is 30 minutes or longer (time interval td>30 minutes) or a day or longer (time interval td>1 day), a grouping condition may be set such that the node having such a time interval becomes a boundary between clusters, that is, the upper limit of the time interval between photographing times of images contained in one cluster is defined. According to this grouping condition, images having a time interval of 30 minutes or longer or one day or longer are split into different clusters.

After setting the thresholds as the grouping conditions, the hierarchy determining portion 82 sets a split flag in each node on the basis of the set threshold and the split parameter th set in the node.

For example, a group-A split flag 1 is set in nodes having split parameters that exceed threshold a which is set as grouping condition A, and a group-A split flag 0 is set in nodes having split parameters that do not exceed threshold a.

If the split flag 1 is set in a node, it means that the time interval between child nodes linked to that node serving as the parent node is longer than the time intervals between the photographing times of the images contained in the target node. In contrast, if the split flag 0 is set in a node, it means that the time interval between child nodes linked to that node serving as the parent node is more or less the same as the time intervals between the photographing times of the images contained in the target node.

After setting the group-A split flags, the hierarchy determining portion 82 sequentially sets the nodes within the binary tree structure as target nodes in ascending order (from leaf to root), and partitions the images by using, as boundaries, the nodes whose time intervals between child nodes are longer than the time intervals of the images contained in the target node, i.e., the nodes in which the group-A split flag 1 is set. As a result, the clusters can be defined by grouping condition A.

Figure 23:
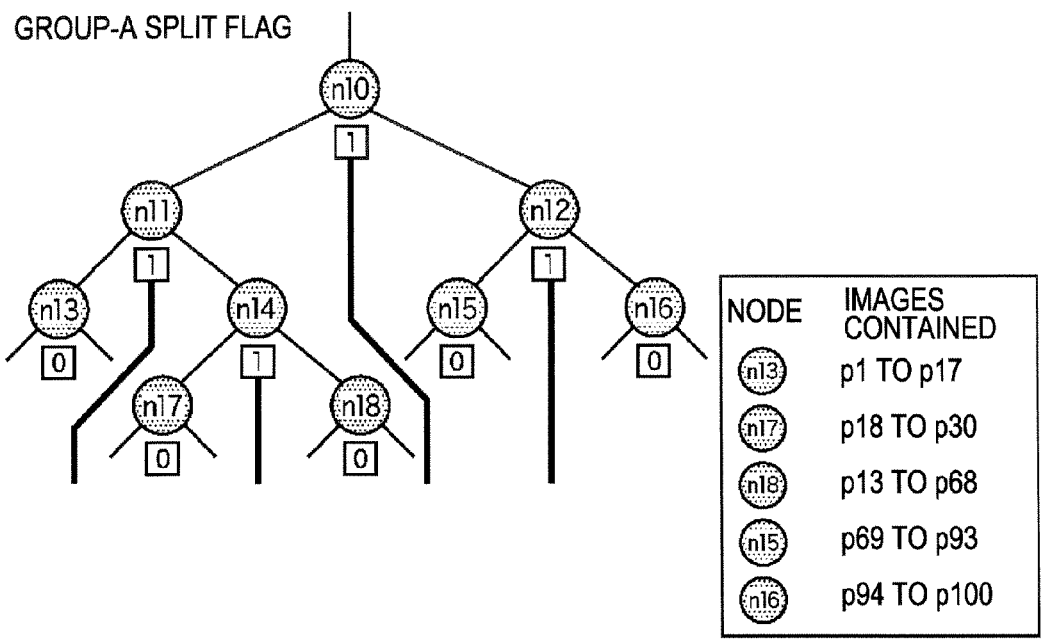
FIG. 23 illustrates an example of the setting of a group-A split flag.

FIG. 23 illustrates an example of the setting of group-A split flags.

In the example shown in FIG. 23, node n11 and node n12 are linked to node n10, which is closest to the root node, as the left child node and the right child node, respectively. Node n13 and node n14 are linked to node 11 as the left child node and the right child node, respectively. Node n15 and node n16 are linked to node n12 as the left child node and the right child node, respectively. Node 17 and node 18 are linked to node 14 as the left child node and the right child node, respectively.

In the example shown in FIG. 23, the group-A split flag 1 is set in nodes n10, n11, n12, and n14, and the clusters are partitioned by using such nodes as the boundaries, as indicated by the thick lines in FIG. 23.

As indicated at the right side in FIG. 23, node n13 contains images p1 through 17; node n17 contains images p18 through p30; node n18 contains images p31 through p68; node n15 contains images p69 through p93; and node n16 contains images p94 through p100.

Figure 24:
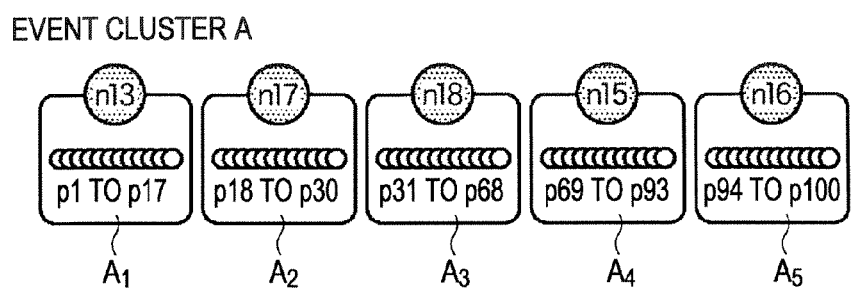
FIG. 24 illustrates an example of clustering results obtained on the basis of grouping condition A.

Accordingly, if the clusters are created by using the nodes in which the group-A split flag 1 is set as the boundaries, images p1 through p100 subjected to clustering are split into clusters (event cluster A) shown in FIG. 24.

That is, images p1 through p17 contained in node n13 form cluster $A_1$; images p18 through p30 contained in node n17 form cluster $A_2$; images p31 through p68 contained in node n18 form cluster $A_3$; images p69 through p93 contained in node n15 form cluster $A_4$; and images p94 through p100 contained in node n16 form cluster $A_5$.

Clustering is performed based on grouping condition A, as described above, and information indicating which range of images are contained in each cluster defined by grouping condition A or information indicating to which cluster each image belongs is obtained as the clustering result based on grouping condition A.

While clustering based on grouping condition A is being performed, clustering based on grouping condition B is also performed in a similar manner.

More specifically, in the hierarchy determining portion 82, the group-B split flag 1 is set in the nodes having split parameters th that exceed threshold b which is set as grouping condition B, and the group-B split flag 0 is set in the nodes having split parameters th that do not exceed threshold b.

After setting the group-B split flags, the hierarchy determining portion 82 sequentially sets the nodes within the binary tree structure as target nodes in ascending order, and partitions the images by using, as boundaries, the nodes whose time intervals between child nodes are longer than the time intervals of the images contained in the target node, i.e., the nodes in which the group-B split flag 1 is set. As a result, the clusters can be defined by grouping condition B.

Figure 25:
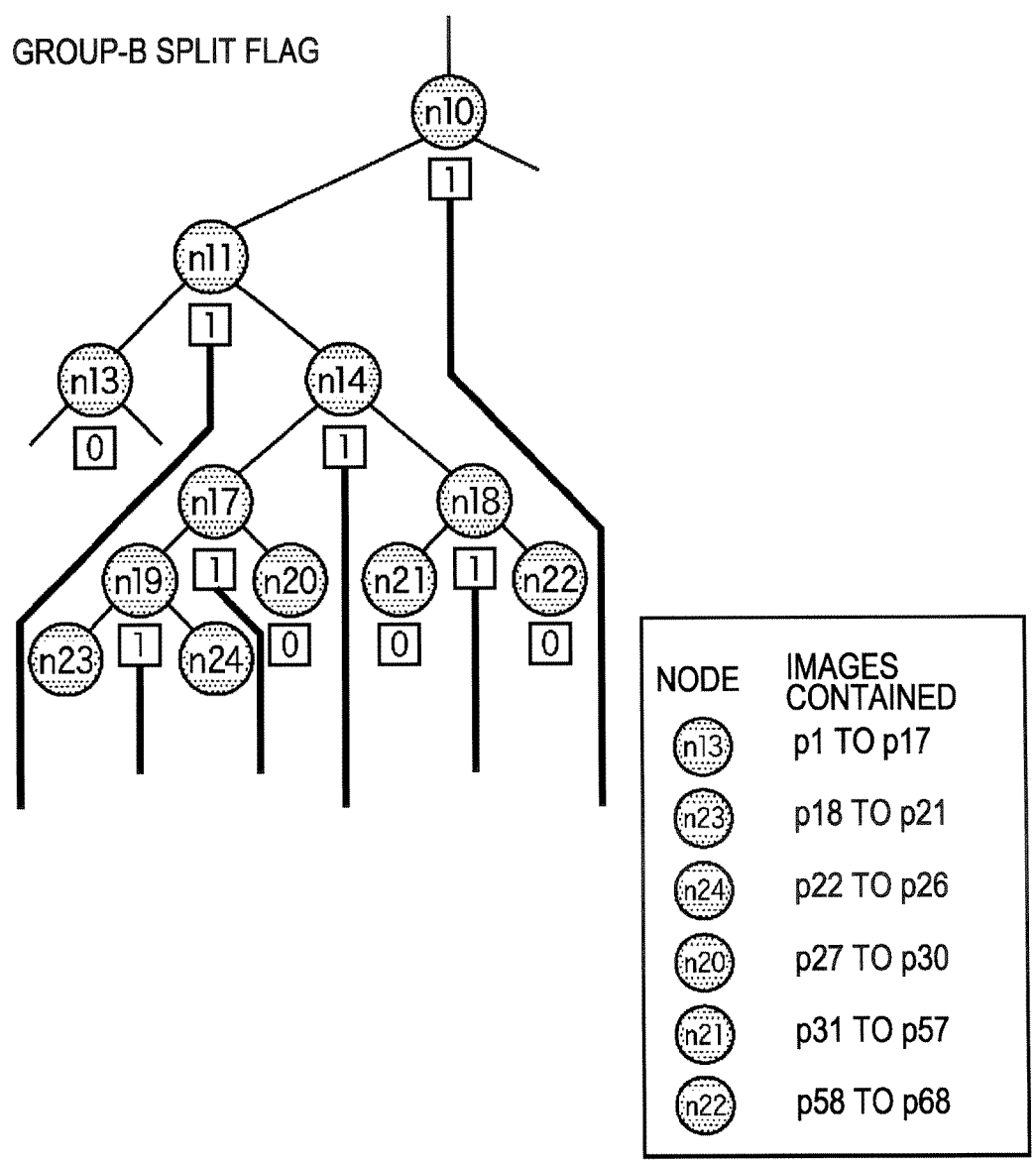
FIG. 25 illustrates an example of the setting of a group-B split flag.

FIG. 25 illustrates an example of the setting of group-B split flags.

In the example shown in FIG. 25, node n10 is linked to node n10, which is closest to the root node, as the left child node. Node n13 and node n14 are linked to node n11 as the left child node and the right child node, respectively. Node n17 and node n18 are linked to node n14 as the left child node and the right child node, respectively. Node 19 and node 20 are linked to node 17 as the left child node and the right child node, respectively. Node n21 and node n22 are linked to node n18 as the left child node and the right child node, respectively. Node n23 and node n24 are linked to node n19 as the left child node and the right child node, respectively.

In the example shown in FIG. 25, the group-B split flag 1 is set in nodes n10, n11, n14, n17, n18, and n19, and the clusters are created by using such nodes as the boundaries, as indicated by the thick lines in FIG. 25.

As indicated at the right side in FIG. 25, node n13 contains images p1 through 17; node n23 contains images p18 through p21; node n24 contains images p22 through p26; node n20 contains images p27 through p30; node n21 contains images p31 through p57; and node n22 contains images p58 through p68.

Figure 26:
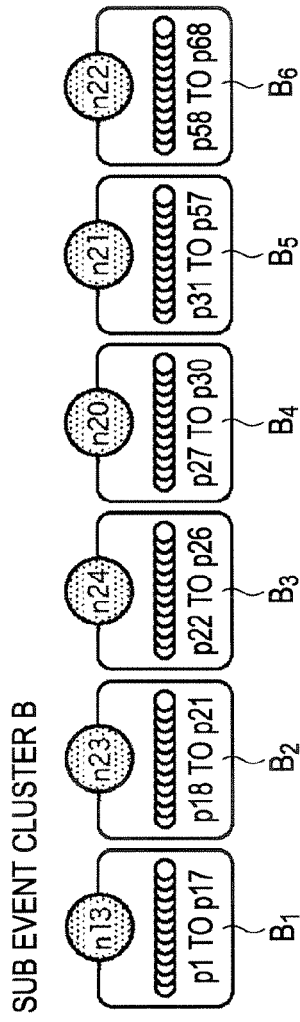
FIG. 26 illustrates an example of clustering results obtained on the basis of grouping condition B.

Accordingly, if the clusters are created by using the nodes in which the group-B split flag 1 is set as the boundaries, images p1 through p68 among images p1 through p100 subjected to clustering are divided into clusters (sub event cluster B) shown in FIG. 26.

That is, images p1 through p17 contained in node n13 form cluster $B_1$; images p18 through p21 contained in node n23 form cluster $B_2$; images p22 through p26 contained in node n24 form cluster $B_3$; images p27 through p30 contained in node n20 form cluster $B_4$; images p31 through p57 contained in node n21 form cluster $B_5$; and images p58 through p68 contained in node n22 form cluster $B_6$.

Clustering is performed based on grouping condition B, as described above, and information indicating which range of images is contained in each cluster defined by grouping condition B or information indicating to which cluster each image belongs is obtained as the clustering result based on grouping condition B. The obtained clustering result is managed by the hierarchy determining portion 82.

Figure 27:
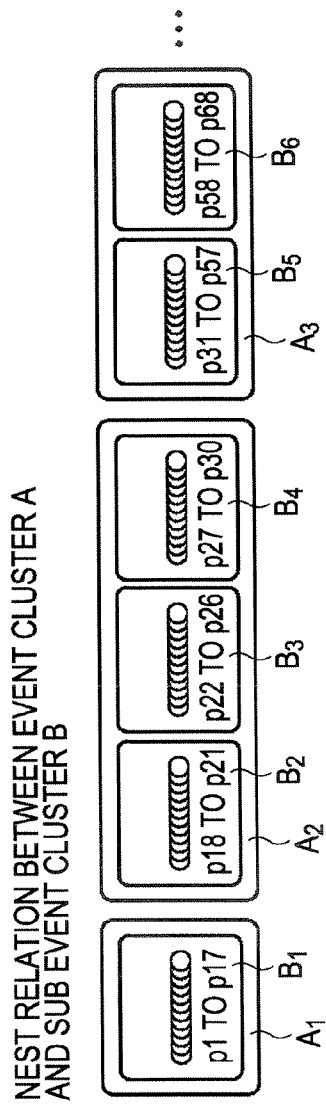
FIG. 27 illustrates a nest relation of clusters.

FIG. 27 illustrates the clustering result based on grouping condition A (FIG. 24) and the clustering result based on grouping condition B (FIG. 26) in an overlapping manner.

If grouping is performed on the basis of a plurality of grouping conditions, as shown in FIG. 27, the resulting clusters have a nest relation.

In the example shown in FIG. 27, cluster $A_1$ and cluster $B_1$ contain the same range of images. Cluster $A_2$ contains cluster $B_2$ through cluster $B_4$, and cluster $A_3$ contains cluster $B_5$ and cluster $B_6$.

If the clusters have the nest relation shown in FIG. 27, folders representing clusters $B_2$ through $B_4$ are indicated as the lower folders of the folder representing cluster $A_2$, and folders representing clusters $B_5$ and $B_6$ are indicated as the lower folders of the folder representing cluster $A_3$.

In this manner, in the computation unit 64, hierarchical clustering and partitional clustering (clustering based on the average of photographing time intervals of the overall images) are performed. As a result of a combination of hierarchical clustering and partitional clustering, images having close photographing intervals are contained in the same cluster, and also, images having time intervals shorter than a threshold are contained in the same cluster.

Another example of the creation of a binary tree structure by the clustering portion 81 is discussed below with reference to FIGS. 28 through 35.

In this example, clustering is not performed on images in the photographing time order, but on individual images regardless of the time order. For example, after the personal computer 1 performs clustering on images captured by the digital camera 2, an image captured by another digital camera, such as an image given by another person, is read into the personal computer 1. In this case, the images including the new image are individually subjected to clustering rather than clustering performed on the images in the photographing time order.

Figure 28:
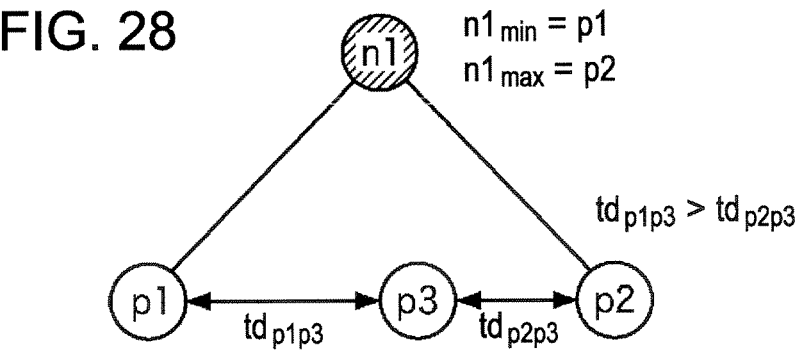
FIGS. 28 through 35 illustrate another example of the creation of a binary tree structure.
Figure 29:
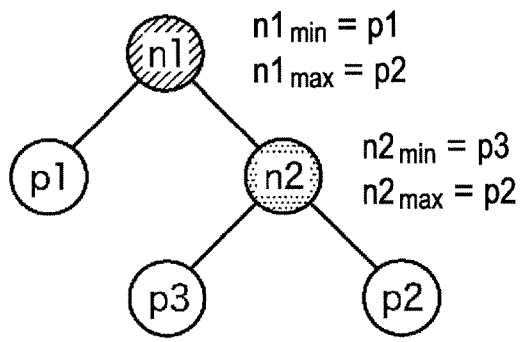

For example, in the state shown in FIG. 13 in which image p1 and image p2 are linked to node n1 as the left child node and the right child node, respectively, a new node, i.e., image p3 newer than image p1 and older than image p2, is inserted into the tree. In this case, if the time interval $td_{p1p3}$ between the photographing time of image p1 and that of image p3 is longer than the time interval $td_{p2p3}$ between the photographing time of image p2 and that of image p3, as shown in FIG. 28, a new node, i.e., node 2, is created, as shown in FIG. 29. Image p3 and image p2 are linked to node n2 as the left child node and the right child node, respectively. Node n2 is linked to node n1 as the right child node instead of image p2.

The photographing time of image p3 is recorded as the minimum time of node n2, and the photographing time of image p2 is recorded as the maximum time of node n2. In this case, the minimum time and the maximum time of node n1, which is the parent node of node n2, remain the same. That is, the minimum time and the maximum time of node n1 are the photographing time of image p1 and the photographing time of image p2, respectively.

Figure 30:
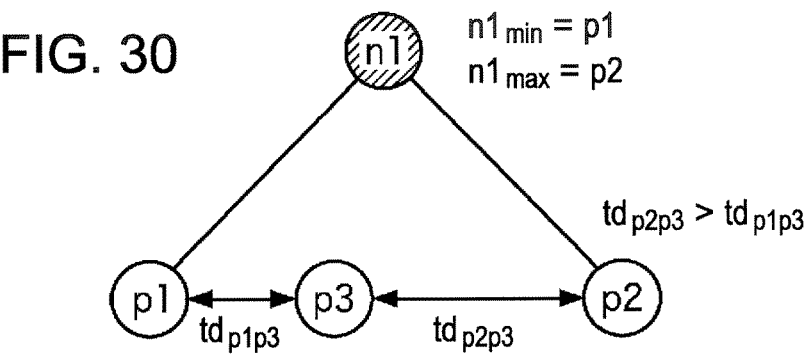
Figure 31:
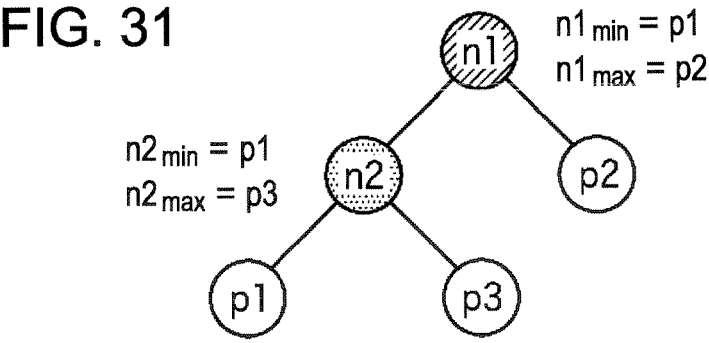

In the state shown in FIG. 13 in which image p1 and image p2 are linked to node n1 as the left child node and the right child node, respectively, a new node, i.e., image p3 newer than image p1 and older than image p2, is inserted into the tree. In this case, if the time interval $td_{p1p3}$ between the photographing time of image p1 and that of image p3 is shorter than the time interval $td_{p2p3}$ between the photographing time of image p2 and that of image p3, as shown in FIG. 30, a new node, i.e., node n2, is created, as shown in FIG. 31. Image p1 and image p3 are linked to node n2 as the left child node and the right child node, respectively. Node n2 is linked to node n1 as the left child node instead of image p1.

The photographing time of image p1 is recorded as the minimum time of node n2, and the photographing time of image p3 is recorded as the maximum time of node n2. In this case, the minimum time and the maximum time of node n1, which is the parent node of node n2, remain the same. That is, the minimum time and the maximum time of node n1 are the photographing time of image p1 and the photographing time of image p2, respectively.

Figure 32:
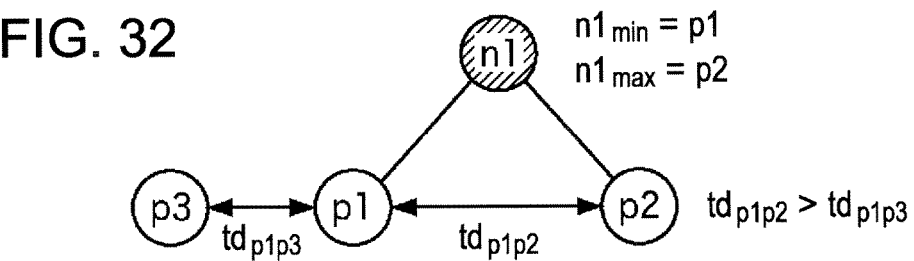
Figure 33:
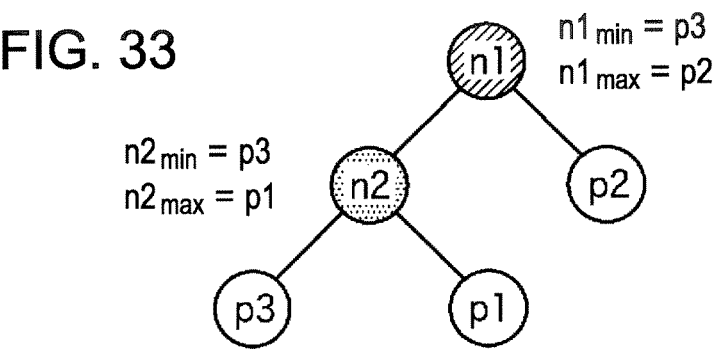

In the state shown in FIG. 13 in which image p1 and image p2 are linked to node n1 as the left child node and the right child node, respectively, a new node, i.e., image p3 older than image p1, is inserted into the tree. In this case, if the time interval $td_{p1p3}$ between the photographing time of image p1 and that of image p3 is shorter than the time interval $td_{p1p2}$ between the photographing time of image p1 and that of image p2, as shown in FIG. 32, a new node, i.e., node n2, is created, as shown in FIG. 33. Image p3 and image p1 are linked to node n2 as the left child node and the right child node, respectively. Node n2 is linked to node n1 as the left child node instead of image p1.

The photographing time of image p3 is recorded as the minimum time of node n2, and the photographing time of image p1 is recorded as the maximum time of node n2. In this case, the minimum time of node n1, which is the parent node of node n2, is updated by the photographing time of image p3, and the maximum time of node n1 remains the same. That is, the maximum time of node n1 is the photographing time of image p2.

Figure 34:
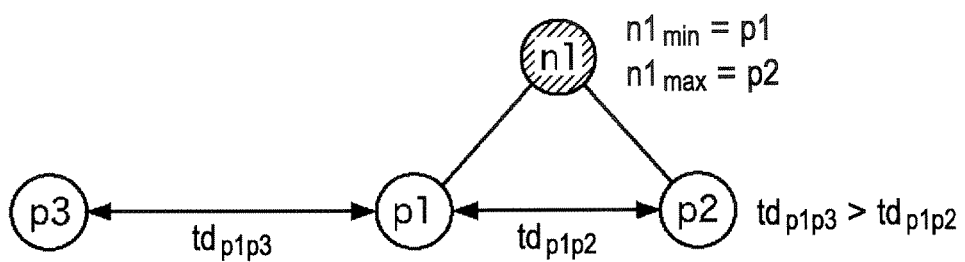
Figure 35:
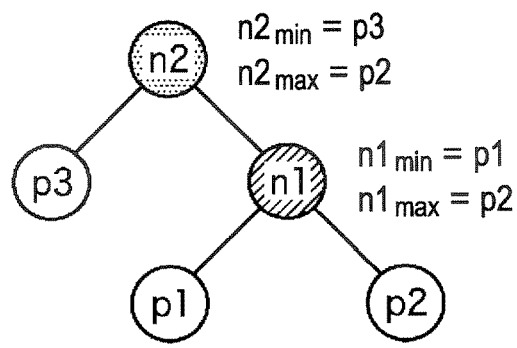

In the state shown in FIG. 13 in which image p1 and image p2 are linked to node n1 as the left child node and the right child node, respectively, a new node, i.e., image p3 older than image p1, is inserted into the tree. In this case, if the time interval $td_{p1p3}$ between the photographing time of image p1 and that of image p3 is longer than the time interval $td_{p1p2}$ between the photographing time of image p1 and that of image p2, as shown in FIG. 34, a new node, i.e., node n2, is created, as shown in FIG. 35. Image p3 and node n1 are linked to node n2 as the left child node and the right child node, respectively.

The photographing time of image p3 is recorded as the minimum time of node n2, and the photographing time of image p2 is recorded as the maximum time of node n2. In this case, the minimum time and the maximum time of node n1 remain the same. That is, the minimum time and the maximum time of node n1 are the photographing time of image p1 and the photographing time of image p2, respectively.

Processing is similarly performed when a new image, such as, images p4, p5, . . . , is inserted. If the inserted image is the newest image among the images that have been subjected to clustering, the processing discussed with reference to FIGS. 12 through 20 is performed, and in other cases, the processing discussed with reference to FIGS. 28 through 35 is performed.

In the event recognizer 63, one event is set in each cluster (node) generated as described above. Accordingly, if the clusters shown in FIG. 24 are formed, in cluster $A_1$, the average of metadata extracted from images p1 through p17 themselves or from EXIF information concerning those images is set as metadata of cluster $A_1$, and the event recognized on the basis of the metadata is set and managed in association with cluster $A_1$. This enables the user to specify a certain event to see images contained in the cluster associated with the specified event.

Referring back to the description with reference to FIG. 6, the user interface controller 65 displays images read from the image DB 61 and also displays the event recognition results described in the metadata managed by the event recognizer 63. Then, an image, such as that shown in FIG. 2, and a screen indicating the event name associated with the image shown in FIG. 2 are displayed.

When images of a certain group are displayed, the user interface controller 65 determines the groups in which the same event as that of the certain group is set on the basis of information managed by the hierarchy determining portion 82 of the computation unit 64, and displays typical images of the determined groups. Then, a screen including the typical images of the groups in which the same event is set, such as that shown in FIG. 3, is displayed.

The operation of the personal computer 1 configured as described above is described below.

Figure 37:
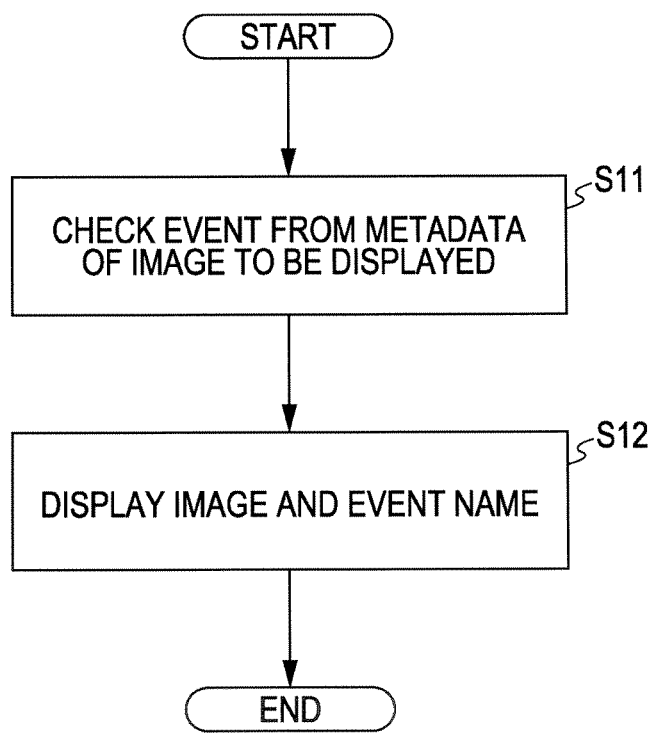
FIG. 37 is a flowchart illustrating an example of image display processing performed by a personal computer.

A description is first given, with reference to the flowcharts in FIGS. 36 and 37, of a series of processing performed by the personal computer 1 for recognizing the event of a certain image and displaying the screen shown in FIG. 2.

FIG. 36 is a flowchart illustrating event recognition processing performed by the personal computer 1.

In step S1, the communication unit 49 reads an image recorded on a recording medium, together with EXIF information, from the digital camera 2. The image and EXIF information read by the communication unit 49 are recorded on the image DB 61 formed in, for example, the storage unit 48, and is used for recognizing an event at a predetermined time.

In step S2, the feature extracting unit 62 extracts features from the target image and EXIF information. That is, the EXIF information processor 71 extracts predetermined information from among various items of information contained in the EXIF information. The face-information extracting portion 71 extracts information concerning the faces contained in the image, and the similar-image recognition processor 73 extracts information, such as the color space of the image.

In step S3, the feature extracting unit 62 generates metadata indicating the information extracted in step S2 (forms the image into vectors), and outputs the generated metadata to the event recognizer 63.

In step S4, the event recognizer 63 recognizes the event from the various items of information indicated in the metadata supplied from the feature extracting unit 62 by referring to the prepared recognition file. Then, in step S5, the event recognizer 63 writes the recognized event into the metadata. Then, metadata, such as that shown in FIG. 8, is generated for each image.

In step S6, the event recognizer 63 writes the generated metadata into a file that manages metadata concerning a plurality of images. The event recognizer 63 then completes the processing.

Image display processing performed by the personal computer 1 is then discussed below with reference to the flowchart in FIG. 37.

In step S11, the user interface controller 65 reads an image to be displayed from the image DB 61, and checks the event associated with the read image from the metadata managed by the event recognizer 63.

In step S12, the user interface controller 65 displays the image read from the image DB 61, and also displays the event name checked in step S11 in the vicinity of the image. Then, the screen, such as that shown in FIG. 2, is displayed.

Figure 38:
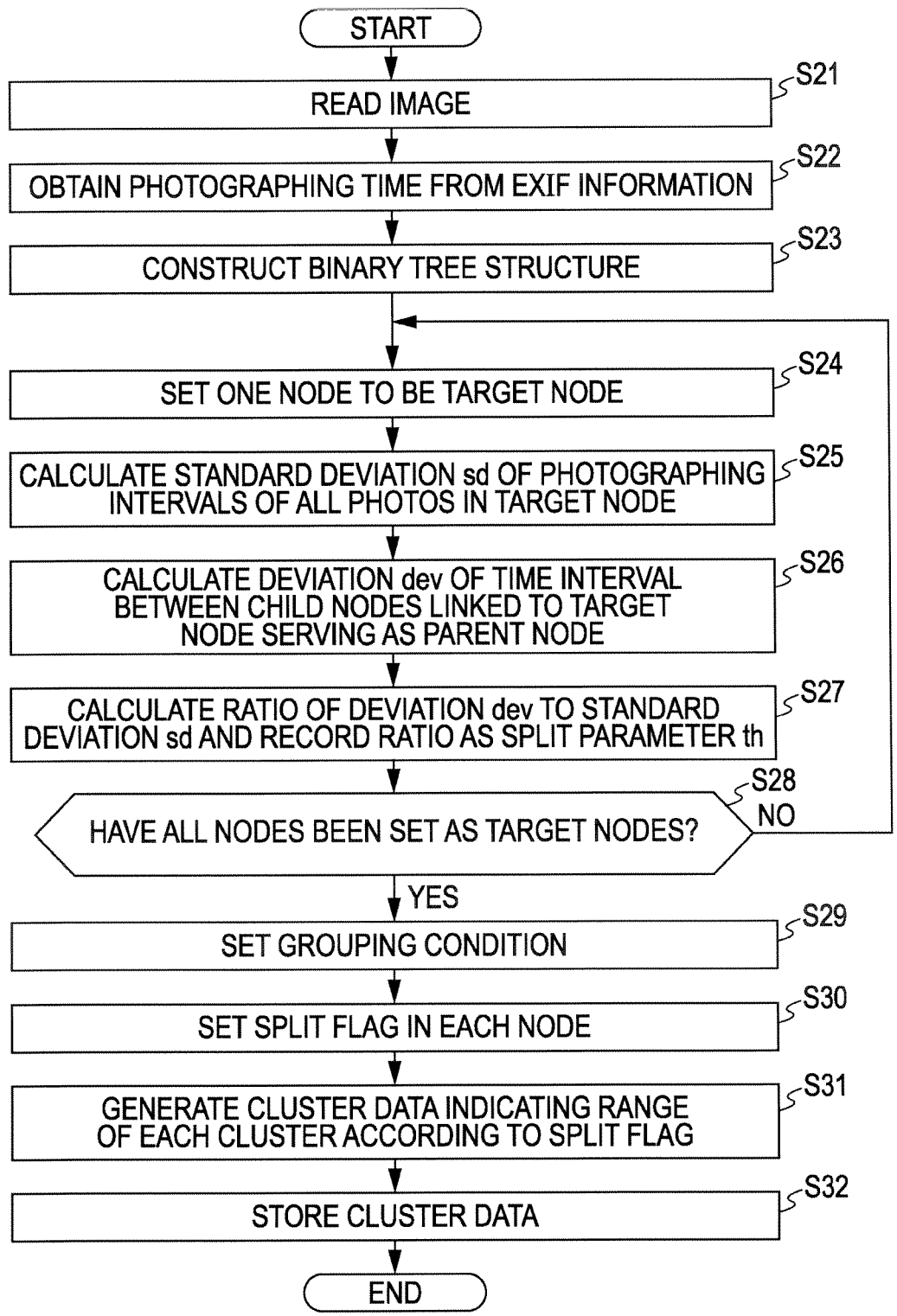
FIG. 38 is a flowchart illustrating cluster data generating processing performed by a personal computer.
Figure 39:
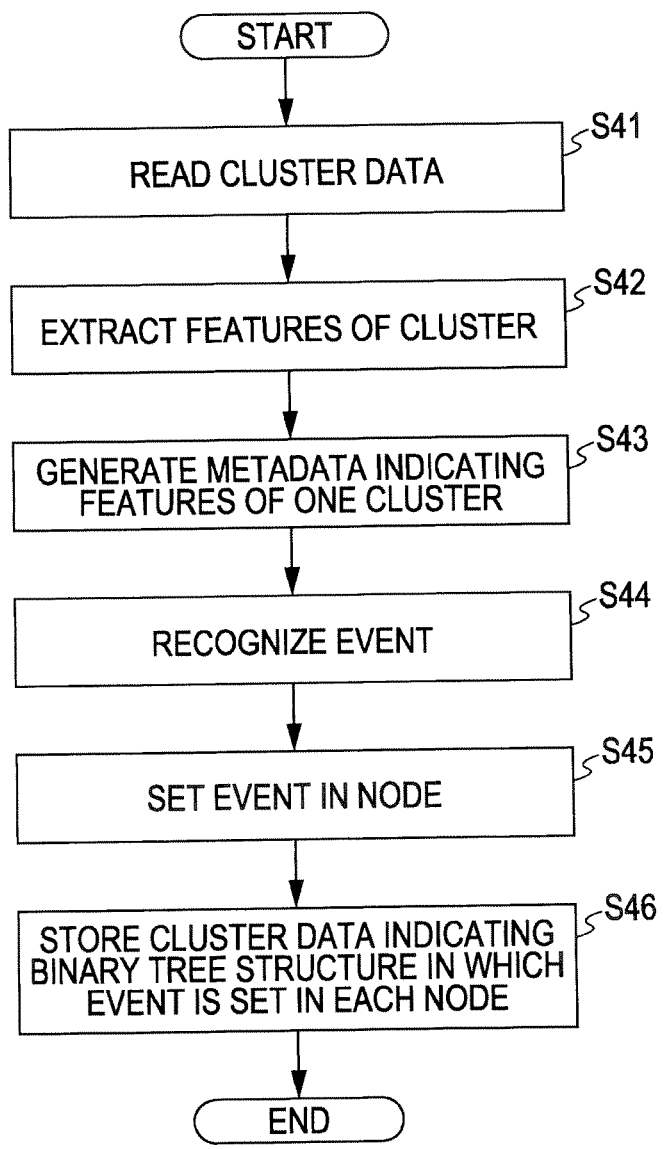
FIG. 39 is a flowchart illustrating another example of event recognition processing performed by a personal computer.
Figure 40:
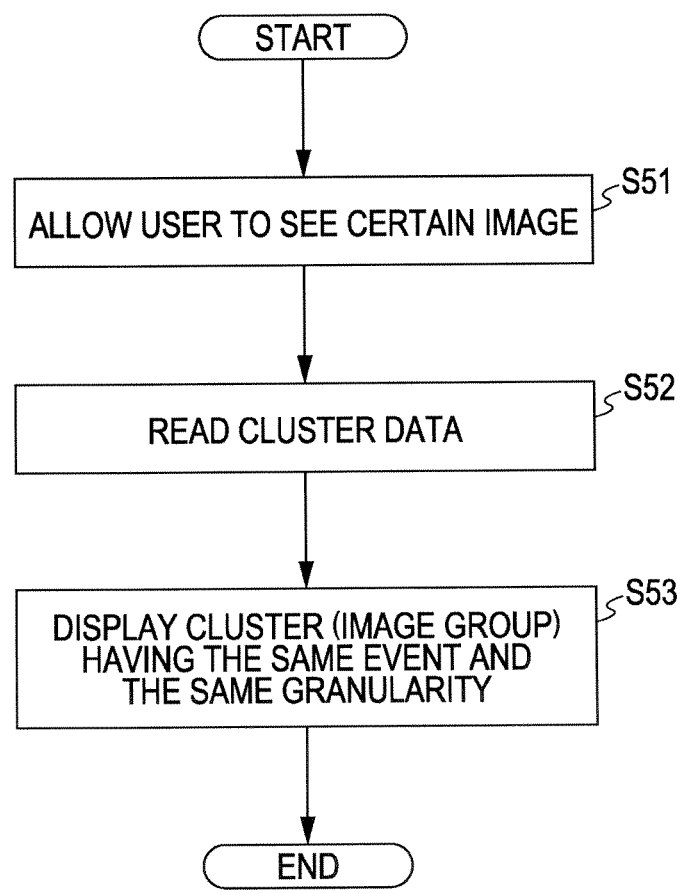
FIG. 40 is a flowchart illustrating another example of image display processing performed by a personal computer.

A description is now given, with reference to FIGS. 38 through 40, of a series of processing performed by the personal computer 1 for displaying a screen, such as that shown in FIG. 3, on the basis of the event set in each cluster.

Processing for generating cluster data by the personal computer 1 is first described with reference to the flowchart in FIG. 38.

In step S21, the communication unit 49 reads an image recorded on a recording medium, together with EXIF information, from the digital camera 2. The read image and EXIF information are recorded on the image DB 61.

In step S22, the EXIF information processor 71 of the feature extracting unit 62 obtains the photographing time from the EXIF information of the target image, and outputs the obtained photographing time to the computation unit 64.

In step S23, the clustering portion 81 of the computation unit 64 constructs a binary tree structure including all images subjected to clustering according to the process discussed with reference to FIGS. 12 through 20, on the basis of the photographing times supplied from the EXIF information processor 71 and the cluster data stored in the clustering portion 81.

In step S24, the hierarchy determining portion 82 sets one node positioned in a predetermined level of the binary tree structure to be a target node. Then, in step S25, the hierarchy determining portion 82 calculates the standard deviation sd of the photographing times of all images in the target node.

In step S26, the hierarchy determining portion 82 calculates the deviation dev of the time interval between child nodes linked to the target node serving as the child's parent node.

In step S27, the hierarchy determining portion 82 calculates the ratio of the deviation dev calculated in step S26 to the standard deviation sd calculated in step S25, and records the calculated ratio in the target node as the split parameter.

Then, in step S28, the hierarchy determining portion 82 determines whether all nodes forming the binary tree structure are set as the target nodes. If a node that has not been set as a target node is found in step S28, the process returns to step S24, and then, the target node is switched.

If it is determined in step S28 that all the nodes forming the binary tree structure have been set as the target nodes, the hierarchy determining portion 82 proceeds to step S29 to set a threshold as the grouping condition. If clusters having different levels of granularity are created for the same image, a plurality of grouping conditions are set in step S29.

In step S30, the hierarchy determining portion 82 compares the split parameter th set in each node with the threshold set as the grouping condition in step S29. As a result of comparison, the hierarchy determining portion 82 sets the split flag 1 in the nodes having split parameters th that exceed the threshold and sets the split flag 0 in the nodes having split parameters th that do not exceed the threshold. If a plurality of grouping conditions are set, a split parameter th is set in each node for each grouping condition.

In step S31, the hierarchy determining portion 82 sequentially sets the nodes in the binary tree structure to the target nodes in ascending order and divides the nodes into clusters by using the nodes in which the split flag 1 is set as the boundaries, and then generates cluster data indicating the range of each cluster.

In step S32, the hierarchy determining portion 82 stores the generated cluster data, and completes the processing.

Processing performed by the personal computer 1 for recognizing the event of each cluster generated as described above is discussed below with reference to the flowchart in FIG. 39.

In step S41, the event recognizer 63 reads the cluster data managed by the hierarchy determining portion 82. Then, in step S42, the event recognizer 63 extracts features of each cluster. For example, the event recognizer 63 determines the average of metadata of images contained in each cluster and sets the determined average as the features of the cluster.

In step S43, the event recognizer 63 generates metadata indicating the features of the cluster extracted in step S42.

In step S44, the event recognizer 63 recognizes the event of the cluster on the basis of the metadata generated in step S43. Then, in step S45, the event recognizer 63 sets (labels) the event so that the event recognition result can be associated with each cluster, and outputs the event information to the hierarchy determining portion 82.

In step S46, the hierarchy determining portion 82 stores the cluster data indicating the binary tree structure in which an event is set in each cluster, and then completes the processing.

Image display processing performed by the personal computer 1 is discussed below with reference to the flowchart in FIG. 40.

In step S51, the user interface controller 65 displays a certain image to allow the user to see that image.

For example, in response to a predetermined operation performed while the image is being displayed, in step S52, the user interface controller 65 reads the cluster data indicating the binary tree structure in which an event is set in each cluster from the hierarchy determining portion 82 of the computation unit 64.

In step S53, the user interface controller 53 selects clusters having the same level of granularity in which the same event as the event associated with the image viewed by the user is set. The user interface controller 53 displays typical images of the selected clusters and displays, as thumbnails, all images contained in a cluster selected from among the clusters represented by the typical images. Then, the screen, such as that shown in FIG. 3, can be displayed.

Images in which the same event as the event associated with the image viewed by the user is set can be automatically presented to the user so that the user's memories can be recalled. In this case, the screen presented to the user is not restricted to that shown in FIG. 3.

Figure 41:
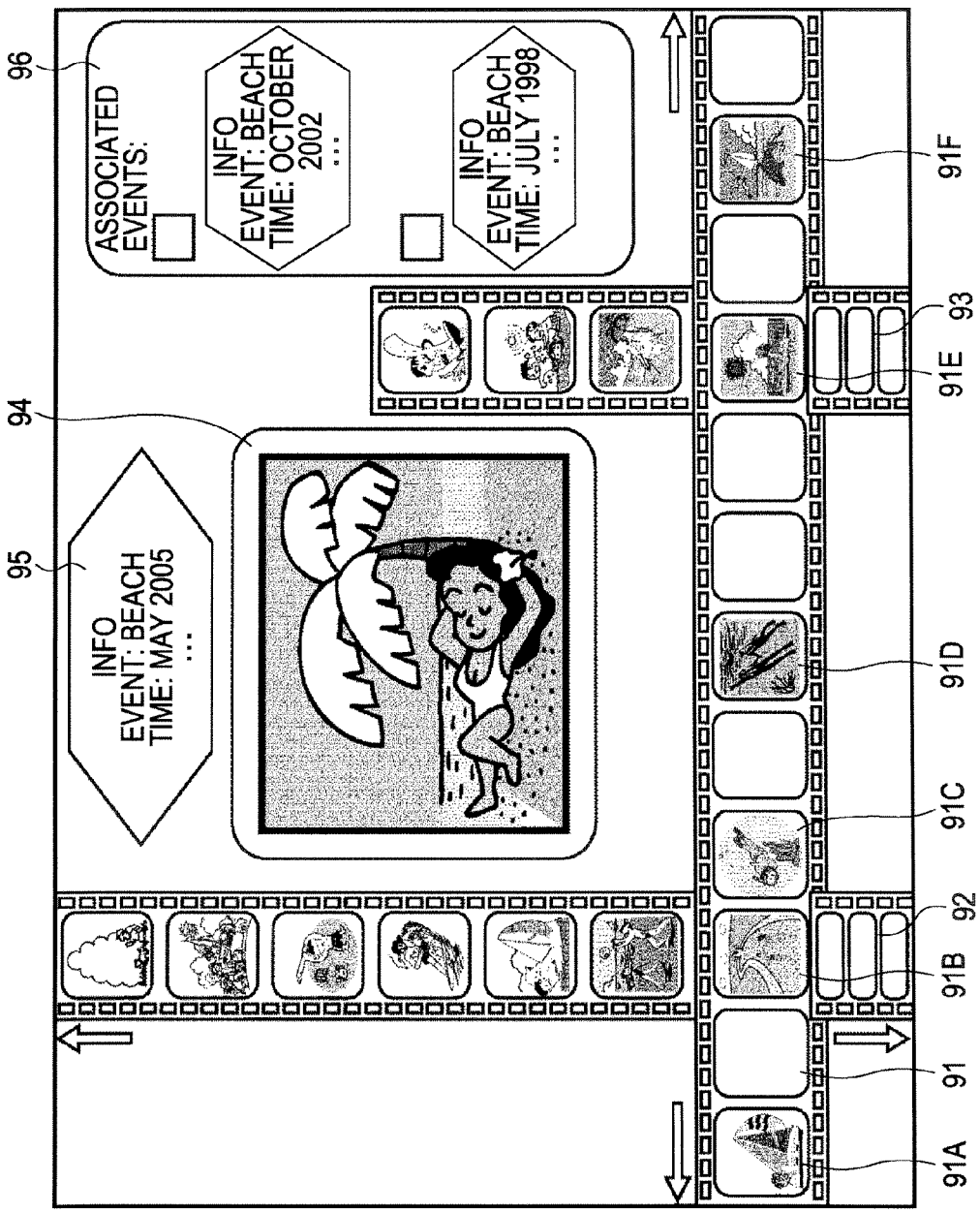
FIG. 41 illustrates another example of an image viewing screen.

FIG. 41 illustrates another example of the display of the image viewing screen.

In FIG. 41, a band-like area 91 horizontally displayed in the screen is an area in which typical images of clusters are displayed in chronological order according to the photographing times from the left to the right. In the example shown in FIG. 41, images 91A through 91F are sequentially displayed from the left to the right.

In the example shown in FIG. 41, images contained in each cluster are displayed, as band-like areas 92 and 93, in the vertical direction, which is orthogonal to the direction in which the band-like area 91 is displayed.

If the user selects, for example, the image 91B, from among the images displayed in the area 91, images contained in the cluster including the image 91B as the typical image are displayed in the area 92 relative to the position of the image 91B.

If the user selects the image 91B, simultaneously with the display of the images in the area 92, images contained in the cluster including the image 91E as the typical image are also displayed in the area 93 relative to the position of the image 91E. Such simultaneous display is implemented based on the fact that the event set in the cluster including the image 91B as the typical image selected from among the images in the area 91 by the user is the same event as that set in the cluster including the image 91E as the typical image.

That is, on the screen shown in FIG. 41, when the user selects a certain image from the images displayed in the area 91, images contained in the cluster including the image selected by the user as the typical image are displayed, and also, images contained in a cluster in which the same event as that of the image selected by the user is set, i.e., images captured in a situation similar to that where the selected image was captured, are automatically displayed, thereby making it possible to recall the user's memories.

If the user switches from the image 91B to the image 91C from the state shown in FIG. 41, images contained in the cluster including the image 91C as the typical image are vertically displayed relative to the position of the image 91C, and also, images contained in a cluster in which the same event of the cluster including the image 91C as the typical image are vertically displayed relative to the position of the typical image of that cluster.

An area 94 formed substantially at the center of the screen shown in FIG. 41 is an area in which images contained in a predetermined cluster selected by the user are displayed in the form of a slide show. An area 95 is an area in which information concerning an image displayed in a slide show is displayed. An area 96 formed at the right side of the screen displays information concerning an image (image 91B in FIG. 41) selected by the user and information (image 91E in FIG. 41) concerning the typical image of a cluster in which the same event as that of the cluster containing the image selected by the user is set.

In the embodiment as described above, the recognition of events is performed by the personal computer 1. Alternatively, the following event recognition service may be implemented. A user may send images and EXIF information to a server on a network, and the server then recognizes events and returns recognition results to the user.

Figure 42:
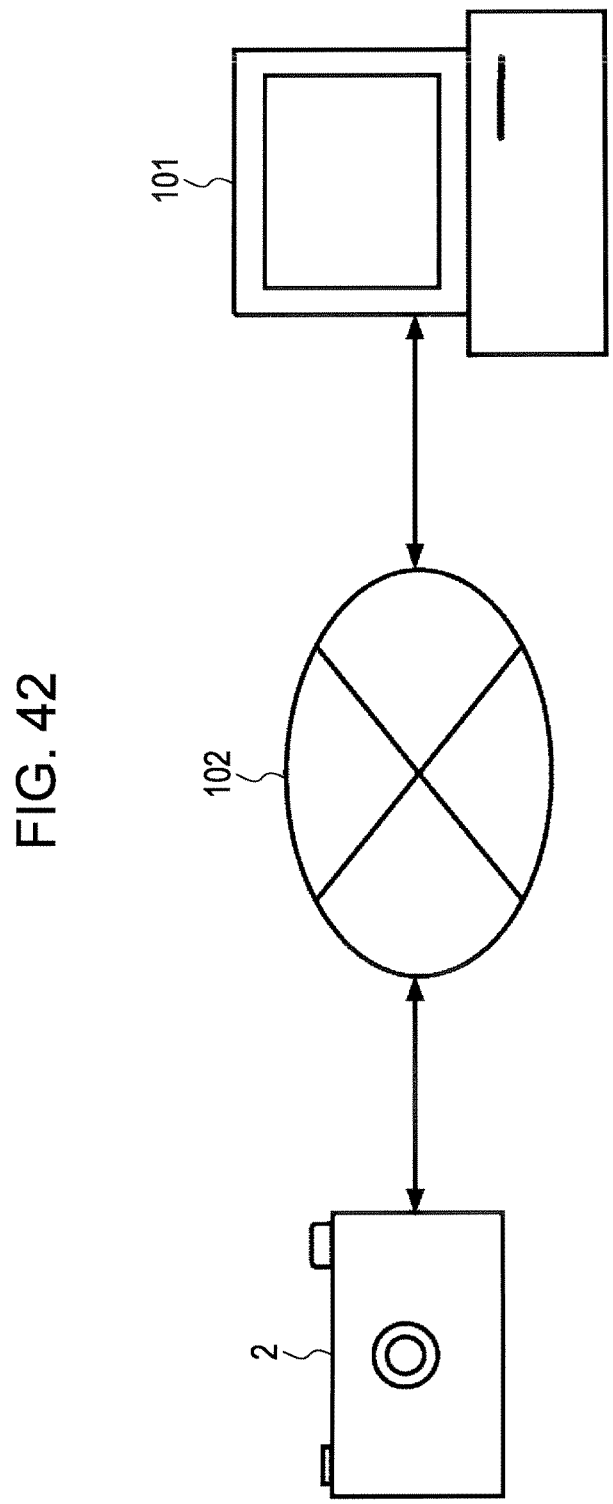
FIG. 42 illustrates an example of the configuration that implements an event recognition service.

FIG. 42 illustrates an example of the configuration of the event recognition service.

In FIG. 42, the digital camera 2 and a server 101 are connected to each other via a network 102, such as the Internet, so that they can communicate with each other.

When, for example, the user of the digital camera 2 performs a predetermined operation, images recorded on the digital camera 2 are sent to the server 101 via the network 102, together with EXIF information, and the server 101 performs the above-described event recognition based on the received information. The event recognition results are returned to the digital camera 2 or a personal computer used by the user via the network 102, and are used for displaying an image viewing screen, such as that shown in FIG. 2.

In this manner, a device may send images and EXIF information to the server 101 via the network 102, and the server 101 recognizes events and returns event recognition results to the device.

In such an event recognition service, the server 101 may also perform the above-described clustering process and return clustering results to a device. Then, the device receives the clustering results together with event recognition results and displays a screen, such as that shown in FIG. 3. Alternatively, the digital camera 2 may extract metadata used for event recognition, and sends only the extracted metadata to the server 101 without sending images themselves so that the server 101 can perform event recognition.

In the above-described embodiment, eight events, such as "travel", "flower-viewing party", "firework", "driving/outing", "party", "wedding", "barbecue/camping", and "sport", are target events for recognition. However, a recognition file for recognizing other events may be generated and prepared by learning so that other events can be recognized.

Data used for event recognition is not restricted to the data shown in FIG. 8, and other information, such as data obtained from images or EXIF information, may be used. For example, information concerning the photographing positions obtained from a global positioning system (GPS) sensor may be used.

In the foregoing embodiment, event recognition, clustering, and display of images as a result of event recognition or clustering are performed by the personal computer 1. Alternatively, functions implementing such event recognition, clustering, and display of images may be loaded in another device, such as a digital camera itself, a cellular telephone, a personal digital assistant (PDA), or a portable game machine integrating a digital camera.

In the above-described embodiment, still images captured by the digital camera 2 are subjected to event recognition. Alternatively, another type of content, such as moving pictures or the mood of music, may be subjected to recognition. In the recognition of the mood of music, for example, while images captured in an event are being displayed in a slide show, music having a mood that matches the event can be automatically played back.

The above-described series of processing may be executed by hardware or software. If software is used, a corresponding software program may be installed from a program recording medium or via a network into a computer built in dedicated hardware or into a device, such as a general-purpose computer that can execute various functions by installing various programs therein.

Such a recording medium may be formed, as shown in FIG. 5, of the removable medium 51, which is distributed to the user for providing the programs and is not contained in the computer, or may be formed of the ROM 42 or a hard disk contained in the storage unit 48 having the programs recorded thereon, which is provided to the user while being built in the computer.

In this specification, steps forming the programs stored in a program recording medium may be executed in chronological order discussed in the specification. Alternatively, they may be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a memory that stores a plurality of previously stored images in groups corresponding to a plurality of predetermined event categories, and that stores metadata corresponding to at least one of the plurality of predetermined event categories;
extraction means for extracting metadata from a captured image that is not among the plurality of previously stored images; and
recognition means for generating a classifier by executing a training algorithm on metadata from a plurality of learning images different from the captured image and for determining an event category corresponding to the captured image from among the plurality of predetermined event categories based on the metadata extracted from the captured image and the classifier generated by the recognition means,
wherein the memory stores the captured image in one of the groups of previously stored images corresponding to the event category determined by the recognition means,
wherein the classifier and the event category determined by the recognition means are updated based on displaying, with the captured image, typical images selected from the previously stored images, each of the typical images being representative of a distinct event category of the plurality of predetermined event categories, and wherein the groups corresponding to the plurality of predetermined event categories are generated by comparing standard deviations of time information for nodes representing a plurality of images, in accordance with an order specified by a data structure used to store the nodes, and classifying a subset of the nodes in at least one different group, based on comparisons with a predetermined threshold.

2. The information processing apparatus according to claim 1, wherein the recognition means manages information concerning the event category determined by the recognition means in association with the captured image.

3. The information processing apparatus according to claim 1, further comprising:
computation means for dividing the plurality of images into the groups corresponding to the plurality of predetermined event categories, wherein
the recognition means sets the event category for each group formed by the computation means.

4. The information processing apparatus according to claim 3, further comprising:
display control means for displaying typical images included in groups in which an identical event category is set.

5. The information processing apparatus according to claim 4, wherein the display control means displays as a list, images included in a group corresponding to a typical image selected from among the typical images.

6. The information processing apparatus according to claim 3, wherein the computation means divides the plurality of images so that a node where a variation in time intervals between times represented by time information included in the attribute information concerning each image is greater than a threshold serves as a boundary between the groups.

7. The information processing apparatus according to claim 3, wherein the computation means manages the plurality of images in the form of a binary tree structure, and divides the plurality of images such that the computation means computes the ratio of a deviation of a time interval between child nodes linked to a target node which serves as a parent node of the child nodes to a standard deviation of time intervals of times represented by time information concerning images in the target node and compares the computed ratio with a threshold to determine whether images included in the child nodes are divided into different groups or are classified into an identical group.

8. An information processing method implemented by an information processing apparatus, the information processing method comprising:
storing a plurality of previously stored images in groups corresponding to a plurality of predetermined event categories, and storing metadata corresponding to at least one of the plurality of predetermined event categories;
extracting metadata from a captured image that is not among the plurality of previously stored images;
generating a classifier by executing a training algorithm on metadata from a plurality of learning images different from the captured image, and determining an event category corresponding to the captured image from among the plurality of predetermined event categories based on the metadata extracted from the captured image and the classifier generated; and
storing the captured image in one of the groups of previously stored images corresponding to the determined event category,
wherein the classifier and the determined event category are updated based on displaying, with the captured image, typical images selected from the previously stored images, each of the typical images being representative of a distinct event category of the plurality of predetermined event categories, and
wherein the groups corresponding to the plurality of predetermined event categories are generated by comparing standard deviations of time information for nodes representing a plurality of images, in accordance with an order specified by a data structure used to store the nodes, and classifying a subset of the nodes in at least one different group, based on comparisons with a predetermined threshold.

9. A non-transitory computer readable storage medium encoded with a computer readable program configured to cause an information processing apparatus to execute a method, the method comprising:
storing a plurality of previously stored images in groups corresponding to a plurality of predetermined event categories, and storing metadata corresponding to at least one of the plurality of predetermined event categories;
extracting metadata from a captured image that is not among the plurality of previously stored images;
generating a classifier by executing a training algorithm on metadata from a plurality of learning images different from the captured image, and determining an event category corresponding to the captured image from among the plurality of predetermined event categories based on the metadata extracted from the captured image and the classifier generated; and
storing the captured image in one of the groups of previously stored images corresponding to the determined event category,
wherein the classifier and the determined event category are updated based on displaying, with the captured image, typical images selected from the previously stored images, each of the typical images being representative of a distinct event category of the plurality of predetermined event categories, and
wherein the groups corresponding to the plurality of predetermined event categories are generated by comparing standard deviations of time information for nodes representing a plurality of images, in accordance with an order specified by a data structure used to store the nodes, and classifying a subset of the nodes in at least one different group, based on comparisons with a predetermined threshold.

10. An information processing apparatus, comprising:
a memory that stores a plurality of previously stored images in groups corresponding to a plurality of predetermined event categories, and that stores metadata corresponding to at least one of the plurality of predetermined event categories;
a processing unit configured to extract metadata from a captured image that is not among the plurality of previously stored images; and
a recognition unit configured to generate a classifier by executing a training algorithm on metadata from a plurality of learning images different from the captured image, and to determine an event category corresponding to the captured image from among the plurality of predetermined event categories based on the metadata extracted from the captured image and the classifier generated by the recognition unit,
wherein the memory stores the captured image in one of the groups of previously stored images corresponding to the event category determined by the recognition unit, and wherein the classifier and the event category determined by the recognition unit are updated based on displaying, with the captured image, typical images selected from the previously stored images, each of the typical images being representative of a distinct event category of the plurality of predetermined event categories, and wherein the groups corresponding to the plurality of predetermined event categories are generated by comparing standard deviations of time information for nodes representing a plurality of images, in accordance with an order specified by a data structure used to store the nodes, and classifying a subset of the nodes in at least one different group, based on comparisons with a predetermined threshold.

11. The information processing apparatus according to claim 1, wherein the metadata includes information indicating at least one of a number and a position of persons in the captured image, an amount of light in the captured image, a color hue in the captured image, and a saturation amount in the captured image.

12. The information processing apparatus according to claim 1, wherein the plurality of predetermined event categories include at least one of a party event, a travel event, a fireworks event, a wedding event, a barbecue event, a camping event, and a sporting event.

13. The information processing apparatus according to claim 1,
wherein the previously stored images and the captured image are hierarchically classified among the predetermined event categories.

14. The information processing apparatus according to claim 7,
wherein the threshold is a variable threshold that specifies a granularity of the groups.

* * * * *